US012543120B2

United States Patent
Shinohara et al.

(10) Patent No.: US 12,543,120 B2
(45) Date of Patent: Feb. 3, 2026

(54) WIRELESS COMMUNICATION MANAGEMENT APPARATUS, WIRELESS COMMUNICATION MANAGEMENT METHOD, AND WIRELESS COMMUNICATION MANAGEMENT PROGRAM

(71) Applicant: NTT, Inc., Tokyo (JP)

(72) Inventors: Shoko Shinohara, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 314 days.

(21) Appl. No.: 18/269,059

(22) PCT Filed: Dec. 25, 2020

(86) PCT No.: PCT/JP2020/048621
§ 371 (c)(1),
(2) Date: Jun. 22, 2023

(87) PCT Pub. No.: WO2022/137479
PCT Pub. Date: Jun. 30, 2022

(65) Prior Publication Data
US 2024/0073822 A1    Feb. 29, 2024

(51) Int. Cl.
*G08C 17/00* (2006.01)
*H02J 7/00* (2006.01)
(Continued)

(52) U.S. Cl.
CPC ....... *H04W 52/0261* (2013.01); *H02J 7/0048* (2020.01); *H02J 7/35* (2013.01)

(58) Field of Classification Search
CPC ........ B60L 50/50; B60L 58/10; H02J 7/0048; H04W 52/0261; H04W 52/02; H04W 52/0203; Y02D 30/70
See application file for complete search history.

(56) References Cited

U.S. PATENT DOCUMENTS

| 7,933,635 | B2* | 4/2011 | Oh ........................ H04W 28/14 |
| | | | 455/574 |
| 11,089,603 | B2* | 8/2021 | Emmanuel ............ H04L 1/1854 |

(Continued)

OTHER PUBLICATIONS

ARIB STD-T 108 1.3 version, "Wireless Equipment Standards for 920 MHz Band Telemeter, Telecontrol and Data Transmission," Apr. 12, 2019.

(Continued)

*Primary Examiner* — Shantell L Heiber

(57) ABSTRACT

A wireless communication management apparatus (100) includes a remaining capacity prediction unit (122) and a time setting unit (123). The remaining capacity prediction unit (122) predicts a remaining capacity ($BL_{after}$) of a battery (305) at a time point after a predetermined period has passed in a wireless communication device (300) on which the battery (305) is mounted. The time setting unit (123) sets a condition that the remaining capacity ($BL_{after}$) of the battery (305) predicted by the remaining capacity prediction unit (122) is greater than an allowable remaining capacity ($BL_{minreq}$) and each of an operating time ($T_{on}$) and a transmittable time ($T_{tx}$) of the wireless communication device (300) falls within the reference range, and sets the operating time ($T_{on}$) and the transmittable time ($T_{tx}$) of the wireless communication device (300) in a state where the condition is satisfied.

10 Claims, 12 Drawing Sheets

(51) Int. Cl.
     *H02J 7/35*      (2006.01)
     *H04W 52/02*     (2009.01)

(56) References Cited

U.S. PATENT DOCUMENTS

| 11,567,503 | B1* | 1/2023 | Roy | G05D 1/028 |
| 2012/0293077 | A1* | 11/2012 | Tousain | H05B 47/105 |
| | | | | 315/297 |
| 2020/0132774 | A1* | 4/2020 | Hara | H02J 7/0048 |
| 2020/0393889 | A1* | 12/2020 | Nge | G06F 11/3062 |
| 2024/0067510 | A1* | 2/2024 | Ulbrich | B66F 9/063 |

OTHER PUBLICATIONS

IEEE Std 802.11ah TM-2016 (IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation, IEEE Computer Society, Dec. 7, 2016.

\* cited by examiner

WIRELESS COMMUNICATION MANAGEMENT APPARATUS, WIRELESS COMMUNICATION MANAGEMENT METHOD, AND WIRELESS COMMUNICATION MANAGEMENT PROGRAM

CROSS-REFERENCE TO RELATED APPLICATIONS

This application is a 371 U.S. National Phase of International Application No. PCT/JP2020/048621, filed on Dec. 25, 2020. The entire disclosure of the above application is incorporated herein by reference.

TECHNICAL FIELD

Embodiments relate to a wireless communication management apparatus, a wireless communication management method, and a wireless communication management program.

BACKGROUND ART

Wireless communication systems including base stations and terminals are known. As a representative example of wireless communication systems, a wireless local area network (LAN) for public use can be given. In a wireless LAN for public use, for example, a use case in which data is transmitted from a base station to a public computer terminal and a smartphone terminal is assumed. On the other hand, in recent years, a wireless LAN for industrial use has appeared. In a wireless LAN for industrial use, for example, a use case in which data measured by an Internet of things (IoT) terminal is transmitted to a base station is assumed.

CITATION LIST

Non Patent Literature

Non Patent Literature 1: ARIB STD-T 108 1.3 version, "Wireless Equipment Standards for 920 MHz Band Telemeter, Telecontrol and Data Transmission," Apr. 12, 2019

Non Patent Literature 2: IEEE Std 802.11ah TM-2016 (IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation, IEEE Computer Society, 7 Dec. 2016

SUMMARY OF INVENTION

Technical Problem

In a use case of a wireless LAN for industrial use, a constraint on a transmission time based on a law is defined for each wireless communication device such as a terminal and a base station in order to enable many specific terminals to coexist and perform communication. Therefore, in the wireless communication system, it is necessary to comply with the restriction on the transmission time of each wireless communication device. As an IoT terminal used in a wireless LAN for industrial use, a terminal in which a battery serves as a power source may be used. In such a wireless communication device on which a battery is mounted, an operating time and a transmission time be controlled in accordance with a remaining capacity of the battery.

The present invention has been made in view of the foregoing circumstances and an objective of the present invention is to provide a wireless communication management apparatus, a wireless communication management method, and a wireless communication management program controlling an operating time and a transmission time of a wireless communication device in accordance with a remaining capacity of a battery while complying with a constraint on a transmission time in the wireless communication device.

Solution to Problem

According to an aspect of the present invention, a wireless communication management apparatus includes a remaining capacity prediction unit and a time setting unit. The remaining capacity prediction unit predicts the remaining capacity of the battery at a time point after a predetermined period has passed in the wireless communication device on which the battery is mounted. On condition that the remaining capacity of the battery predicted by the remaining capacity prediction unit is larger than the allowable remaining capacity and each of the operating time and the transmittable time of the wireless communication device falls within the reference range, the time setting unit sets the operating time and the transmittable time of the wireless communication device to a state where the conditions are satisfied.

Advantageous Effects of Invention

According to the embodiment, it is possible to provide a wireless communication management apparatus, a wireless communication management method, and a wireless communication management program controlling an operating time and a transmission time of a wireless communication device in accordance with a remaining capacity of a battery while complying with a constraint on a transmission time in the wireless communication device.

DESCRIPTION OF EMBODIMENTS

Figure 1:
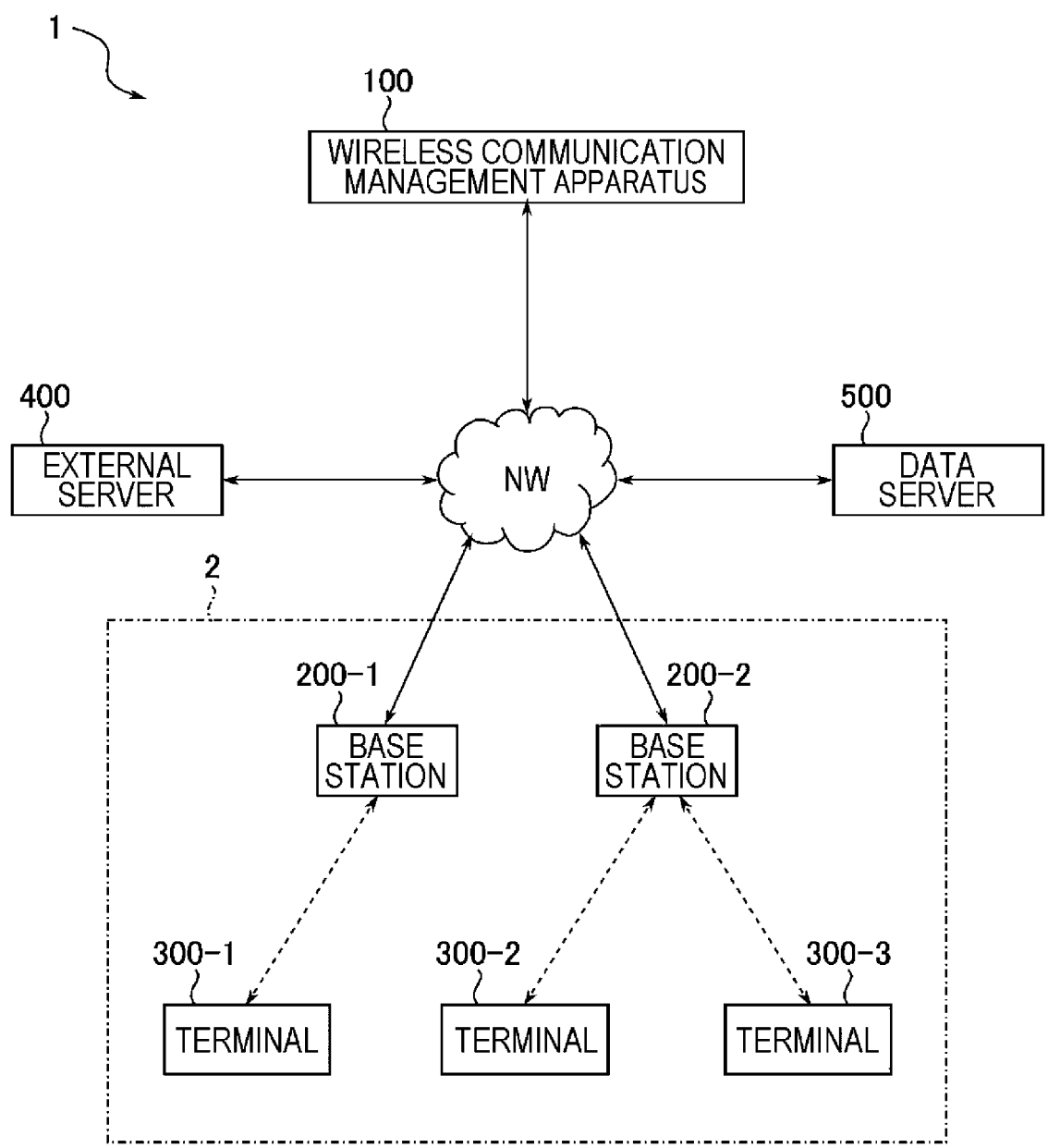
FIG. 1 is a block diagram illustrating an example of a configuration of a communication system according to an embodiment.

Hereinafter, embodiments will be described with reference to the drawings. In the following description, constituents that have the same functions and configurations are denoted by the same reference numerals. When a plurality of constituents having a common reference sign are distinguished, the constituents are distinguished by a further reference sign (for example, hyphens and numbers such as "-1") attached after the common reference sign.

First, a configuration of a communication system according to an embodiment will be described. FIG. 1 is a block diagram illustrating an example of a configuration of a communication system according to the embodiment. As illustrated in FIG. 1, a communication system 1 is a system that manages a wireless environment of a wireless communication system 2. The communication system 1 includes a wireless communication management apparatus 100, a plurality of base stations 200-1 and 200-2, a plurality of terminals 300-1, 300-2, and 300-3, an external server 400, and a data server 500. The plurality of base stations 200-1 and 200-2 and the plurality of terminals 300-1 to 300-3 are included in the wireless communication system 2.

Hereinafter, when each of the plurality of base stations 200-1 and 200-2 is not particularly distinguished, the base stations 200-1 and 200-2 are referred to as the "base station 200" in some cases. Each of the plurality of terminals 300-1 to 300-3 may be referred to as the "terminal 300" unless otherwise distinguished. Furthermore, the base station 200 and the terminal 300 may be collectively referred to as "wireless communication devices".

The wireless communication system 2 is a wireless communication system for industrial use. The wireless communication system 2 is configured to use a frequency band (unlicensed band) that can be used without having a wireless station license. In the wireless communication system 2, for example, a sub-gigahertz (GHz) band is used as an unlicensed band. The sub gigahertz band includes, for example, a 920 megahertz (MHz) band.

The wireless communication management apparatus 100 is an on-premises data processing server that manages a wireless environment of the wireless communication system 2. The wireless communication management apparatus 100 is configured to form wired connection with the base station 200, the external server 400, and the data server 500 via, for example, a router or a hub (not illustrated) in the network NW.

The base station 200 is a master unit (AP: access point) of the wireless communication system 2. The base station 200 is configured to connect the terminal 300 and the wireless communication management apparatus 100 and connect the terminal 300 and the data server 500 via the network NW.

The terminal 300 is a slave unit (STA: station) of the wireless communication system 2. The terminal 300 is, for example, an IoT terminal. The terminal 300 is configured to be wirelessly connected to a corresponding base station 200.

In the example of FIG. 1, the terminal 300-1 is configured to be wirelessly connected to the base station 200-1. The terminals 300-2 and 300-3 are configured to be wirelessly connected to the base station 200-2. However, the terminal 300-1 may also be configured to be wirelessly connected to the base station 200-2. The terminals 300-2 and 300-3 may also be configured to be wirelessly connected to the base station 200-1. In this way, wireless connection between the terminal 300 and the base station 200 may be appropriately selected from a plurality of paths.

The external server 400 is a server that stores information regarding an external environment of the wireless communication system 2 (external environment information). The data server 500 is a server in which sensor information measured by the wireless communication system 2 is aggregated and stored.

Figure 2:
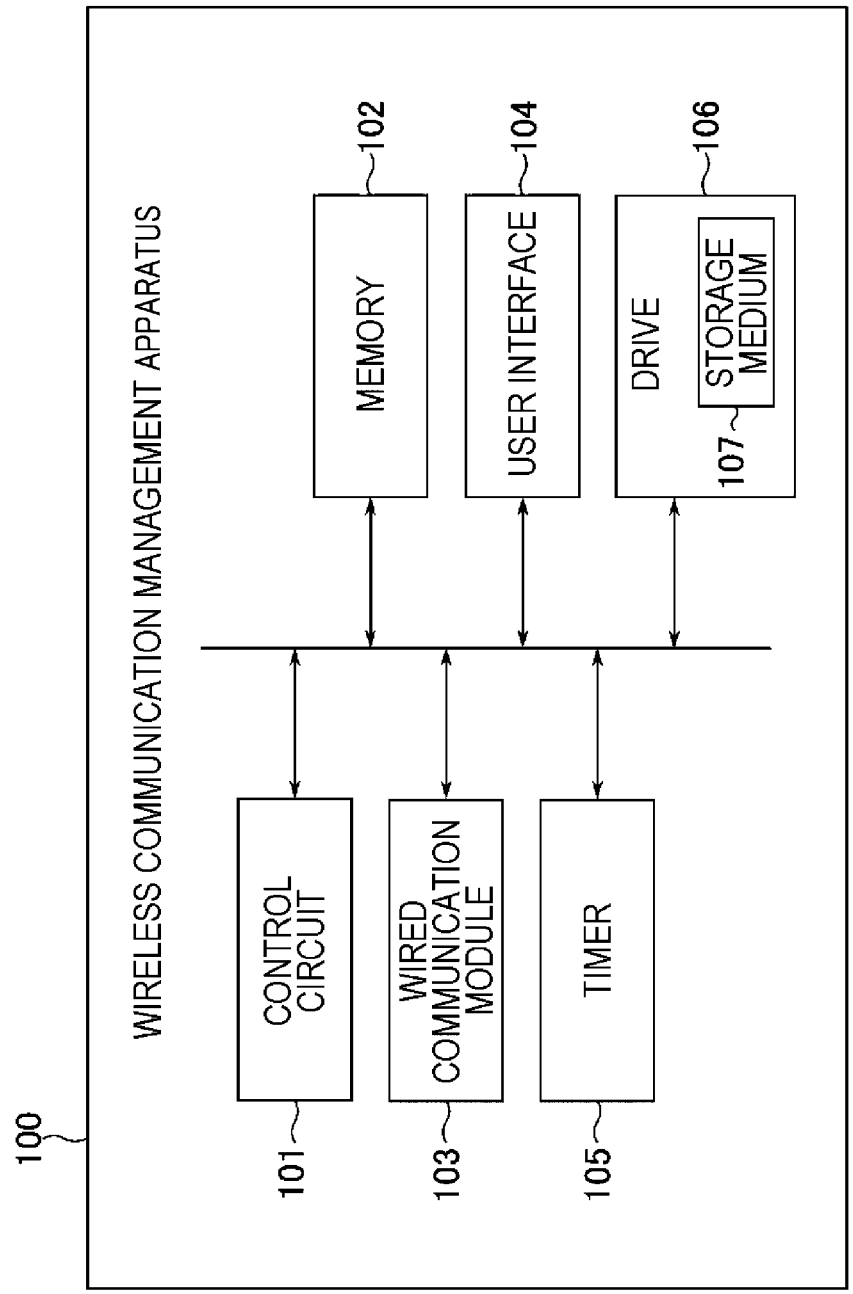
FIG. 2 is a block diagram illustrating an example of a hardware configuration of a wireless communication management apparatus according to the embodiment.

Next, a hardware configuration of a main configuration in the communication system according to the embodiment will be described. FIG. 2 is a block diagram illustrating an example of a hardware configuration of the wireless communication management apparatus according to the embodiment. The wireless communication management apparatus 100 includes a control circuit 101, a memory 102, a wired communication module 103, a user interface 104, a timer 105, and a drive 106.

The control circuit 101 is a circuit that controls each constituent of the wireless communication management apparatus 100 as a whole. The control circuit 101 includes a central processing unit (CPU), a random access memory (RAM), a read only memory (ROM), and the like. The memory 102 is an auxiliary storage device of the wireless communication management apparatus 100. The memory 102 includes, for example, a hard disk drive (HDD), a solid state drive (SSD), and a memory card. The memory 102 stores various types of information used for a wireless communication management operation and a wireless communication management program.

The wireless communication management program can be transmitted from the outside of the wireless communication management apparatus 100 via the network NW to be stored in the memory 102. The wireless communication management operation is a series of operations executed to manage an environment of wireless communication in the wireless communication system 2 appropriately. The wireless communication management program is a program that causes the control circuit 101 to execute the wireless communication management operation. Details of the wireless communication management operation will be described below.

The wired communication module 103 is a circuit used to transmit and receive data by a wired signal. The wired communication module 103 is configured, for example, to conform to the TCP/IP hierarchical model. Specifically, for example, a configuration corresponding to a network interface layer of the wired communication module 103 conforms to Ethernet. The configuration corresponding to the Internet layer of the wired communication module 103 conforms to the Internet protocol (IP). A configuration corresponding to the transport layer of the wired communication module 103 conforms to a transmission control protocol (TCP). The configuration corresponding to the application layer of the wired communication module 103 conforms to the Secure shell (SSH).

The user interface 104 is a circuit that communicates information between the user and the control circuit 101. The user interface 104 includes an input device and a display device. The input device includes, for example, a touch panel and an operation button. The display device includes, for example, a liquid crystal display (LCD), an electroluminescence (EL) display, and the like. The user interface 104 converts an input (user input) from the user into an electrical signal and then transmits an electrical signal to the control circuit 101.

The timer 105 is a circuit that measures time. For example, the timer 105 starts counting based on a starting instruction from the control circuit 101 (SET). When a count value becomes equal to or greater than a threshold value in the set state, the timer 105 notifies the control circuit 101 of timeout (TIMEOUT). The timer 105 ends (resets) the counting based on an ending instruction from the control circuit 101 (RESET).

The drive 106 is a device that reads a program stored in the storage medium 107. The drive 106 includes, for example, a compact disk (CD) drive, and a digital versatile disk (DVD) drive. The storage medium 107 is a medium that accumulates information such as programs electrically, magnetically, optically, mechanically, or chemically. The storage medium 107 may store a wireless communication management program.

Figure 3:
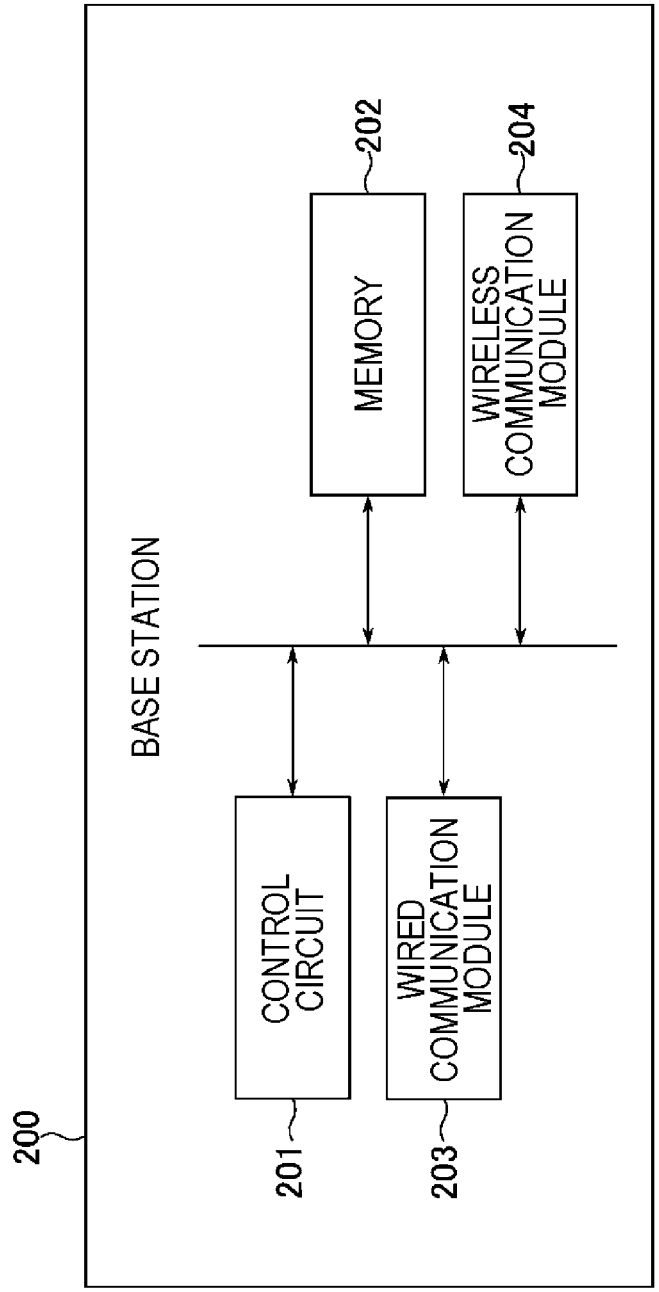
FIG. 3 is a block diagram illustrating an example of a hardware configuration of a base station according to the embodiment.

FIG. 3 is a block diagram illustrating an example of a hardware configuration of a base station according to the embodiment. As illustrated in FIG. 3, the base station 200 includes a control circuit 201, a memory 202, a wired communication module 203, and a wireless communication module 204.

The control circuit 201 is a circuit that controls each constituent of the base station 200 as a whole. The control circuit 201 includes a CPU, a RAM, and a ROM. The memory 202 is an auxiliary storage device of the base station 200. The memory 202 includes, for example, an HDD, an SSD, a memory card, and the like. The memory 202 stores control information of the base station 200 generated by the wireless communication management apparatus 100 in the wireless communication management operation.

The wired communication module 203 is a circuit used to transmit and receive data by a wired signal. The wired communication module 203 conforms to a protocol stack equivalent to that of the wired communication module 103. As a result, the wired communication module 203 can be connected to the wired communication module 103 in a wired manner.

The wireless communication module 204 is a circuit used to transmit and receive data by a wireless signal. The wireless communication module 204 is connected to an antenna (not illustrated). The wireless communication module 204 is configured to conform to, for example, a TCP/IP hierarchical model. Specifically, for example, a configuration corresponding to the network interface layer of the wireless communication module 204 conforms to Institute of Electrical and Electronics Engineers (IEEE) 802.11ah. The configuration corresponding to the Internet layer of the wireless communication module 204 conforms to IP. The configuration corresponding to the transport layer of the wireless communication module 204 conforms to TCP. The configuration corresponding to the application layer of the wireless communication module 204 conforms to SSH.

Figure 4:
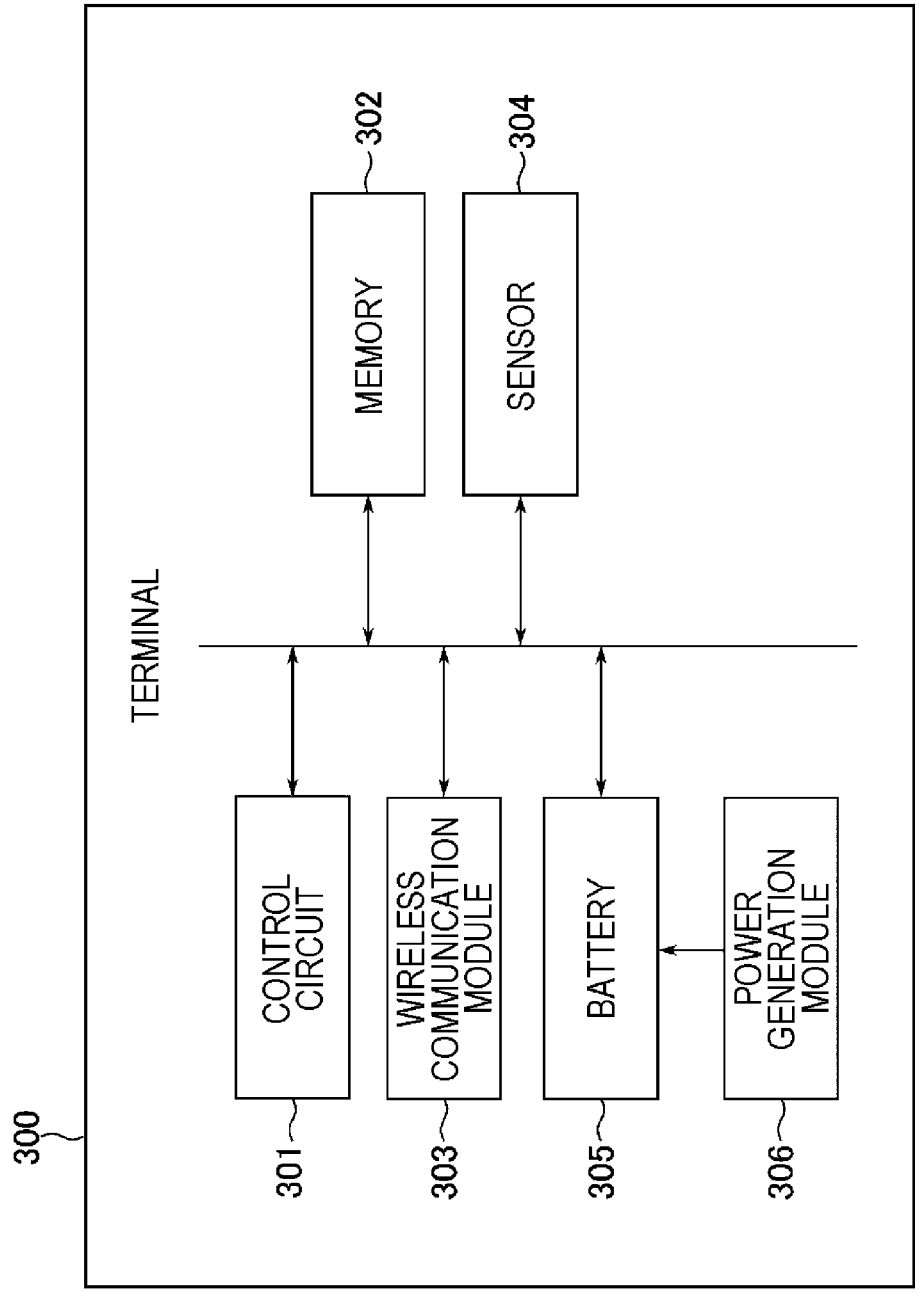
FIG. 4 is a block diagram illustrating an example of a hardware configuration of a terminal according to the embodiment.

FIG. 4 is a block diagram illustrating an example of a hardware configuration of a terminal according to an embodiment. As illustrated in FIG. 4, the terminal 300 includes a control circuit 301, a memory 302, a wireless communication module 303, sensor 304, a battery 305, and a power generation module 306.

The control circuit 301 is a circuit that controls each constituent of the terminal 300 as a whole. The control circuit 301 includes a CPU, a RAM, and a ROM. The memory 302 is an auxiliary storage device of the terminal 300. The memory 302 includes, for example, an HDD, an SSD, and a memory card. The memory 302 stores control information generated by the wireless communication management device 100 in a wireless communication management operation and sensor information measured by the sensor 304.

The wireless communication module 303 is a circuit used to transmit and receive data by a wireless signal. The wireless communication module 303 conforms to a protocol stack equivalent to that of the wireless communication module 204. Accordingly, the wireless communication module 303 can be wirelessly connected to the wireless communication module 204. The sensor 304 is a circuit that measures data monitored by the wireless communication system 2. The sensor information measured by the sensor 304 is aggregated in the data server 500 via the base station 200 and the network NW.

The battery 305 is a capacity for supplying power to the terminal 300. The power generation module 306 is a circuit that generates power with sunlight. The battery 305 is charged through solar power generation in the power generation module 306. The battery 305 and the power generation module 306 may be provided in one or more of the terminals 300-1 to 300-3. Power may be stably supplied from an external power supply to a terminal in which the battery 305 and the power generation module 306 are not provided.

Figure 5:
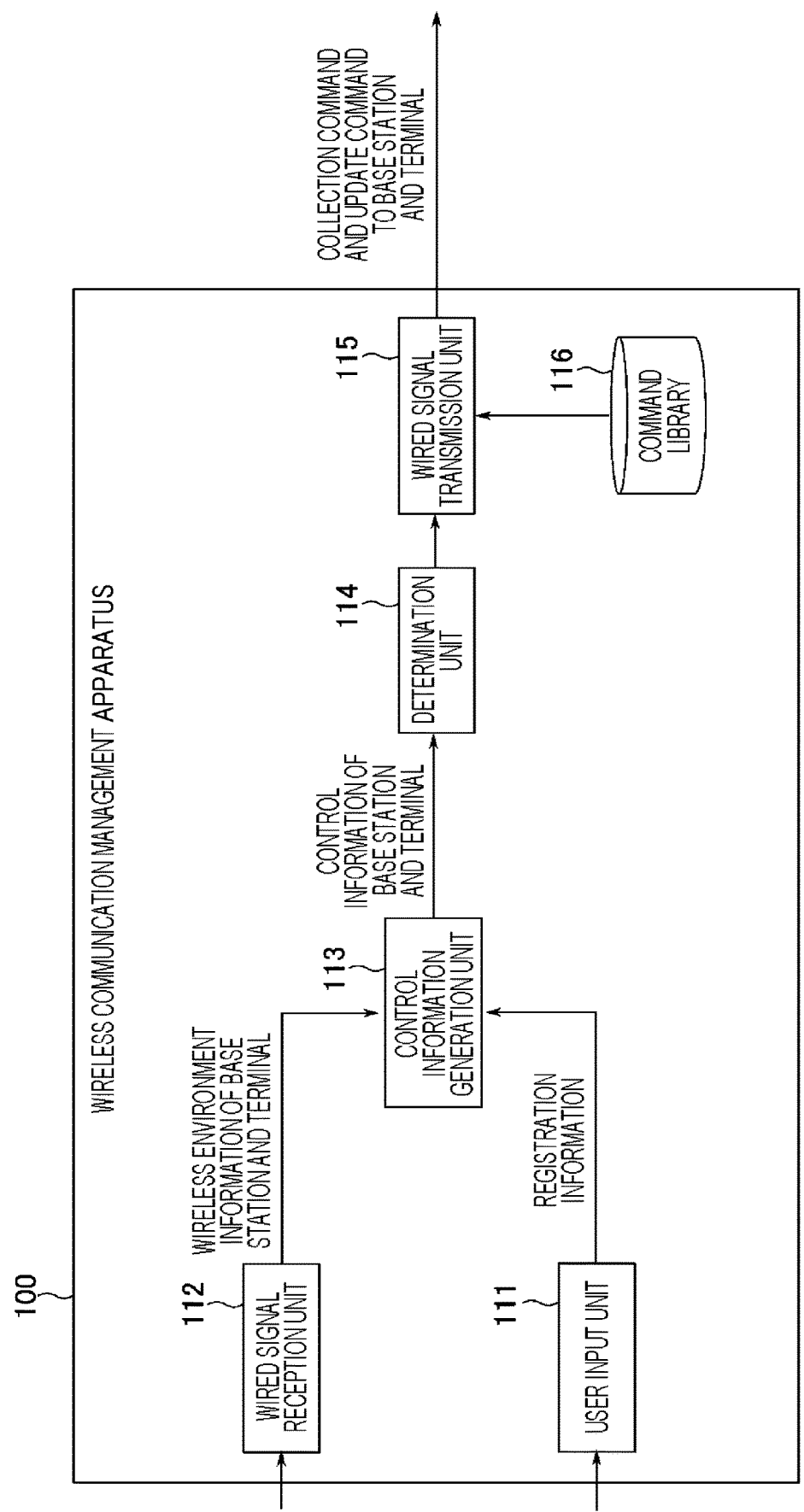
FIG. 5 is a block diagram illustrating an example of a functional configuration of a wireless communication management apparatus according to the embodiment.

Next, a functional configuration of a main configuration in the communication system according to the embodiment will be described. FIG. 5 is a block diagram illustrating an example of a functional configuration of the wireless communication management apparatus according to the embodiment. The CPU of the control circuit 101 loads the wireless communication management program stored in the memory 102 or the storage medium 107 on the RAM. Then, the CPU of the control circuit 101 controls constituents 102 to 106 by interpreting and executing the wireless communication management program loaded on the RAM. Accordingly, as illustrated in FIG. 5, the wireless communication management apparatus 100 functions as a computer including a user input unit 111, a wired signal reception unit 112, a control information generation unit 113, a determination unit 114, a wired signal transmission unit 115, and a command library 116.

The user input unit 111 transmits registration information input by the user to the control information generation unit 113. The registration information includes device information and constraint information. The device information is information used for the wireless communication management apparatus 100 to uniquely identify the base station 200 and the terminal 300. The device information includes, for example, a user name, a password, an IP address, and a management target flag for each of the base station 200 and the terminal 300. The user name, the password, and the IP address are used for the wireless communication management apparatus 100 to log in the base station 200 and the terminal 300 by SSH. The management target flag is information for identifying whether the corresponding base station 200 and terminal 300 are targets of the wireless communication management operation. The constraint information is information indicating constraint conditions with which the wireless communication system 2 complies based on a law such as a radio law. The constraint information includes, for example, a restriction range of a total transmission time for each wireless communication device, such as an upper limit value of the total transmission time for each wireless communication device.

The wired signal reception unit 112 receives the wireless environment information of the base station 200 and the terminal 300 from the base station 200. The wired signal reception unit 112 receives the external environment information from the external server 400. The wired signal reception unit 112 transmits the received various kinds of environmental information to the control information generation unit 113. The wireless environment information is information collected from the base station 200 and the terminal 300 to evaluate a throughput of wireless communication in the wireless communication management operation. The wireless environment information includes, for example, an SSID, a channel, a bandwidth, a frequency, a received signal strength indication (RSSI), a maximum transmission unit (MTU) size, and a modulation and coding scheme (MCS), and an aggregation number (maximum aggregation number) of a peripheral basic service set (BSS) as information common to the base station 200 and the terminal 300. The wireless environment information can include, for example, information indicating the remaining capacity of the battery 305 as information specific to the terminal 300 on which the battery 305 and the power generation module 306 are mounted. The external environment information is information collected from the external server 400 to evaluate the throughput of wireless communication. The external environment information includes, for example, information regarding weather in a district where the wireless communication system 2 (terminal 300) is used, such as a predicted value of sunshine hours in a district where the wireless communication system 2 is provided.

The control information generation unit 113 generates control information of the base station 200 and the terminal 300 based on the registration information, the wireless environment information of the base station 200 and the terminal 300, and the external environment information. The control information generation unit 113 may store the received various types of information in the memory 102 until all the information used for the wireless communication management operation is prepared. The control information generation unit 113 transmits the generated control information to the determination unit 114. The control information includes setting information related to parameters used to construct a wireless communication environment of the base station 200 and the terminal 300. The control information of a certain wireless communication device is generated based on at least the wireless environment information collected from the wireless communication device. The control information of a certain device can be generated further based on wireless environment information collected from devices other than the device. The control information includes an access parameter, a channel, and a transmission rate for each of the base station 200 and the terminal 300. The control information includes information indicating an operating time and a transmittable time for each of the base station 200 and the terminal 300 and a transmission frequency (duty ratio) for each of the base station 200 and the terminal 300. In addition, the control information includes information indicating the number of frames that can be transmitted for each wireless communication device and information indicating a traffic amount that can be transmitted for each wireless communication device.

The determination unit 114 determines whether to update a wireless environment setting in accordance with the generated control information for each of the base station 200 and the terminal 300 for which the control information has been generated. The determination unit 114 further determines whether the updating involves restart for each of the base station 200 and the terminal 300 determined to update the wireless environment setting. The determination unit 114 transmits a set of the control information and the determination result for each of the base station 200 and the terminal 300 to the wired signal transmission unit 115. The wired signal transmission unit 115 generates various commands for controlling the base station 200 and the terminal 300 based on an instruction from the control circuit 101. Various commands are generated with reference to the command library 116.

In the command library 116, a command group used for the wireless communication management operation is stored in advance. The command library 116 stores, for example, a collection command and an update command. The collection command is a command for collecting wireless environment information from the designated base station 200 or terminal 300 (for example, an IP address). The update command is a command for updating the wireless environment setting of the designated base station 200 or terminal 300 (for example, an IP address) with the control information. Therefore, the update command includes control information for updating the wireless environment setting of the designated base station 200 or terminal 300. The update command may include an instruction to restart the designated base station 200 or terminal 300.

Figure 6:
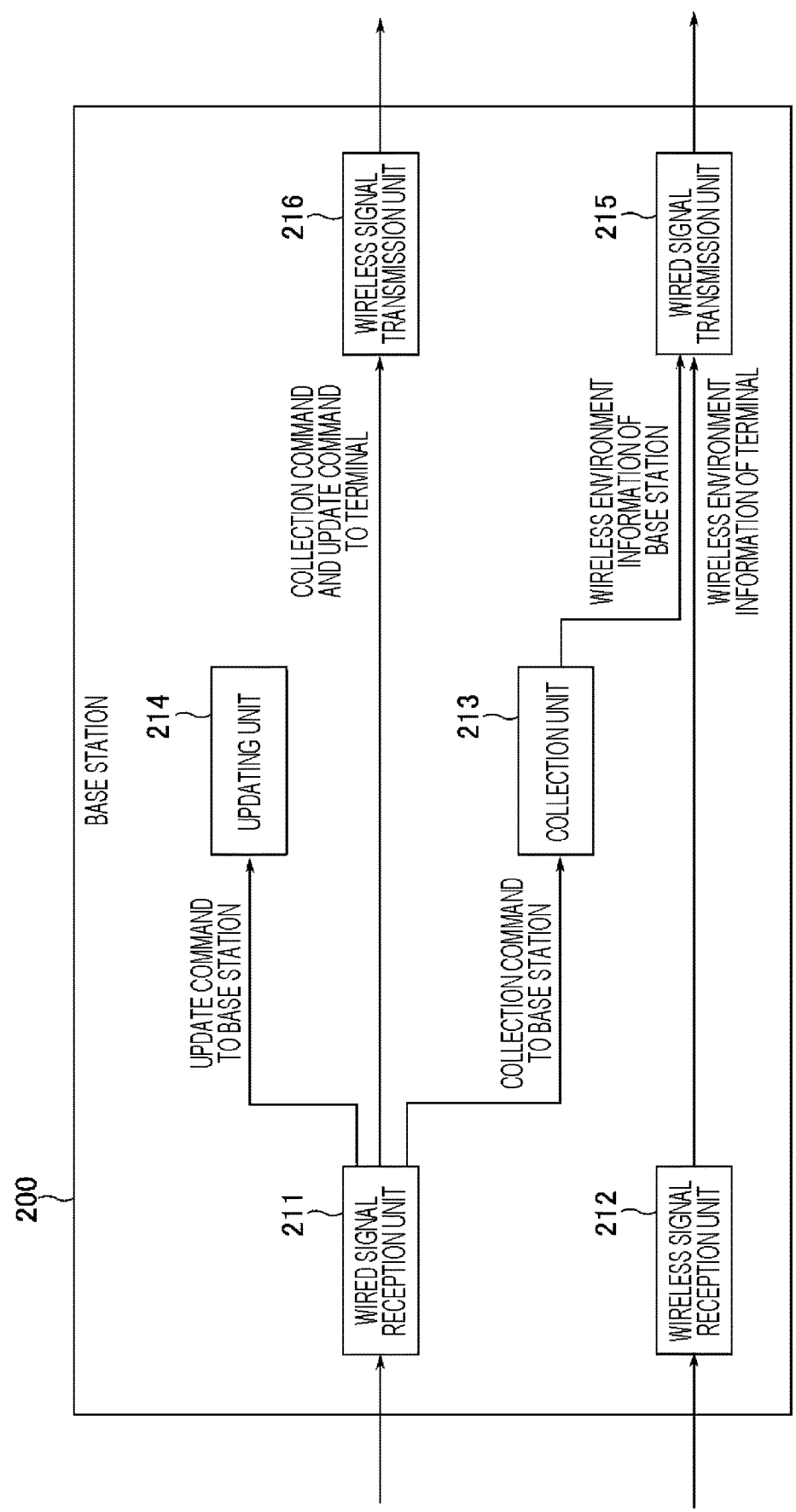
FIG. 6 is a block diagram illustrating an example of a functional configuration of a base station according to the embodiment.

FIG. 6 is a block diagram illustrating an example of a functional configuration of a base station according to the embodiment. The CPU of the control circuit 201 controls constituents 202 to 204 based on various commands transmitted from the wireless communication management apparatus 100. Accordingly, as illustrated in FIG. 6, the base station 200 functions as a computer including a wired signal reception unit 211, a wireless signal reception unit 212, a collection unit 213, an updating unit 214, a wired signal transmission unit 215, and a wireless signal transmission unit 216.

The wired signal reception unit 211 receives the collection command and the update command from the wireless communication management apparatus 100. When the collection command addressed to the base station 200 (to the base station 200) is received, the wired signal reception unit 211 transmits the collection command to the collection unit 213. When the update command to the base station 200 is received, the wired signal reception unit 211 transmits the update command to the updating unit 214. When the collection command and the update command addressed to the terminal 300 (to the terminal 300) are received, the wired signal reception unit 211 transmits the collection command and the update command to the wireless signal transmission unit 216. When data is transmitted from the wired signal reception unit 211 to the wireless signal transmission unit 216, the transmission data is converted from an Ethernet frame format to a frame format of 802.11ah. The wireless signal reception unit 212 receives the wireless environment information of the terminal 300 from the terminal 300. The wireless signal reception unit 212 transmits the received wireless environment information of the terminal 300 to the wired signal transmission unit 215. When data is transmitted from the wireless signal reception unit 212 to the wired signal transmission unit 215, the transmission data is converted from the frame format of 802.11ah to the Ethernet frame format.

The collection unit 213 collects the wireless environment information of the base station 200 based on the received collection command. The collection unit 213 transmits the collected wireless environment information of the base station 200 to the wired signal transmission unit 215. The updating unit 214 updates the wireless environment setting of the base station 200 by control information in the update command based on the received update command. When the update command includes a restarting instruction, the updating unit 214 restarts the base station 200. The wired signal transmission unit 215 transmits the received wireless environment information of the base station 200 to the wireless communication management apparatus 100. The wired signal transmission unit 215 transfers the received wireless environment information of the terminal 300 to the wireless communication management apparatus 100. The wireless signal transmission unit 216 transfers the received collection command and update command of the terminal 300 to the terminal 300.

Figure 7:
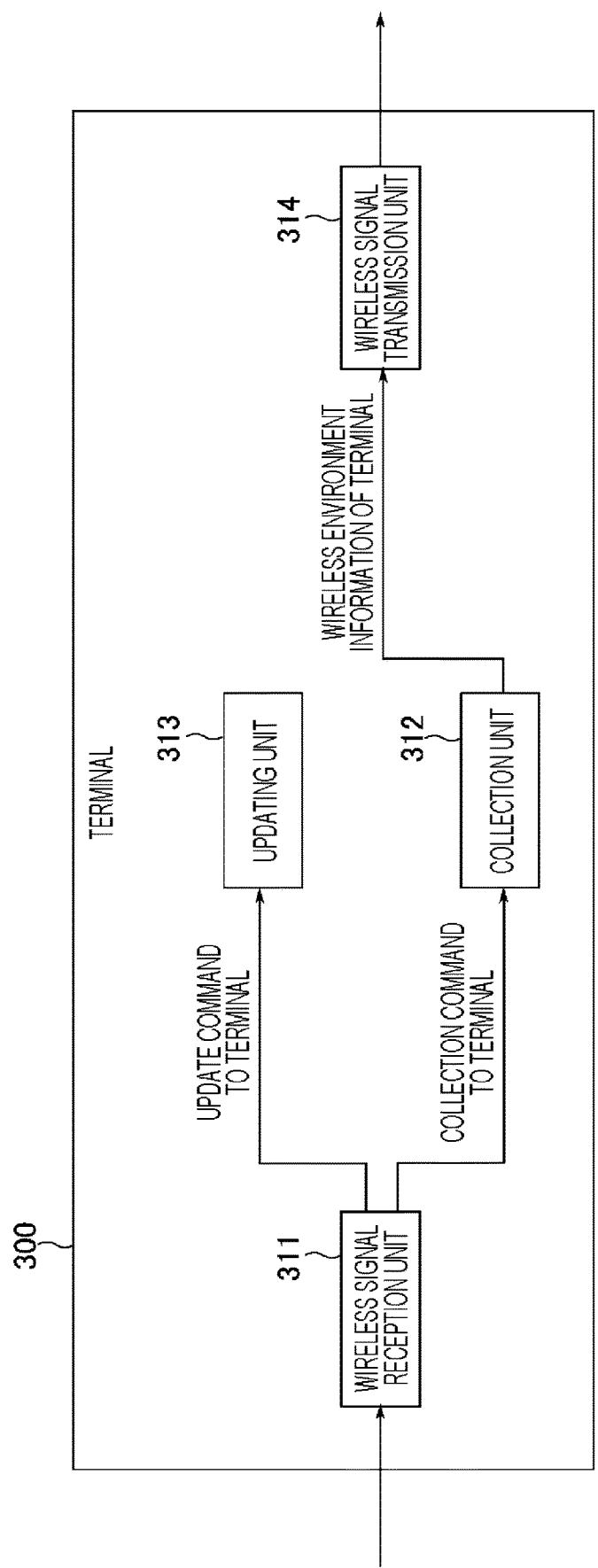
FIG. 7 is a block diagram illustrating an example of a functional configuration of a terminal according to the embodiment.

FIG. 7 is a block diagram illustrating an example of a functional configuration of a terminal according to the embodiment. The CPU of the control circuit 301 controls the constituents 302 and 303 based on various commands transmitted from the wireless communication management apparatus 100.

Accordingly, as illustrated in FIG. 7, the terminal 300 functions as a computer including a wireless signal reception unit 311, a collection unit 312, an updating unit 313, and a wireless signal transmission unit 314.

The wireless signal reception unit 311 receives the collection command and the update command from the base station 200. The wireless signal reception unit 311 transmits the collection command to the collection unit 312. The wireless signal reception unit 311 transmits the update command to the updating unit 313. The collection unit 312 collects the wireless environment information of the terminal 300 based on the received collection command. The collection unit 312 transmits the collected wireless environment information of the terminal 300 to the wireless signal transmission unit 314. The updating unit 313 updates the wireless environment setting of the terminal 300 by control information in the update command based on the received update command. When the update command includes a restarting instruction, the updating unit 313 restarts the terminal 300. The wireless signal transmission unit 314 transmits the collected wireless environment information of the terminal 300 to the base station 200.

Figure 8:
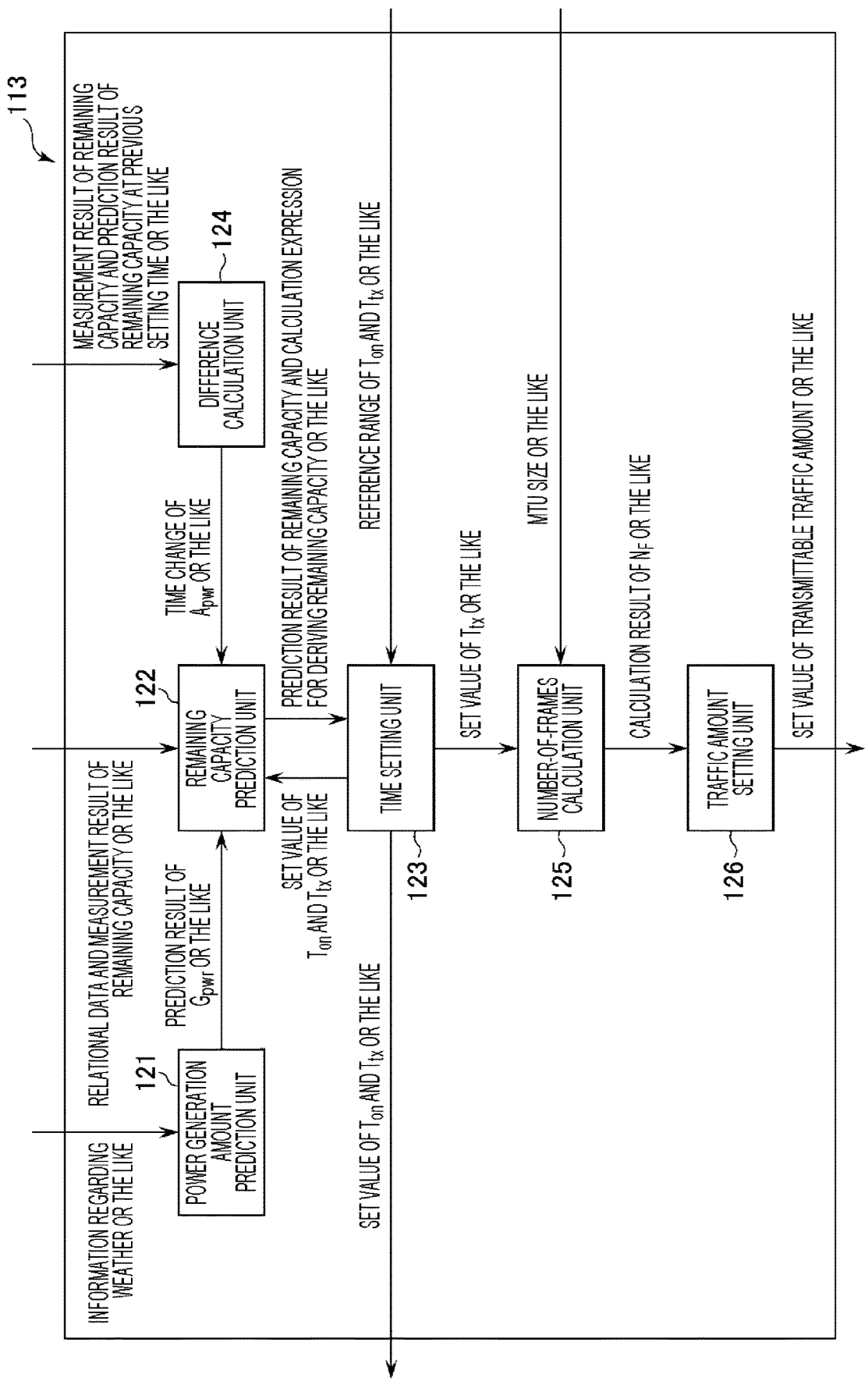
FIG. 8 is a block diagram illustrating an example of a functional configuration of a control information generation unit of the wireless communication management apparatus according to the embodiment.

FIG. 8 is a block diagram illustrating an example of a functional configuration of a control information generation unit of the wireless communication management apparatus according to the embodiment. As illustrated in FIG. 8, the control information generation unit 113 includes a power generation amount prediction unit 121, a remaining capacity prediction unit 122, a time setting unit 123, a difference calculation unit 124, a number-of-frames calculation unit 125, and a traffic amount setting unit 126. Each of the power generation amount prediction unit 121, the remaining capacity prediction unit 122, the time setting unit 123, the difference calculation unit 124, the number-of-frames calculation unit 125, and the traffic amount setting unit 126 performs a part of a process performed by the control information generation unit 113.

Figure 9:
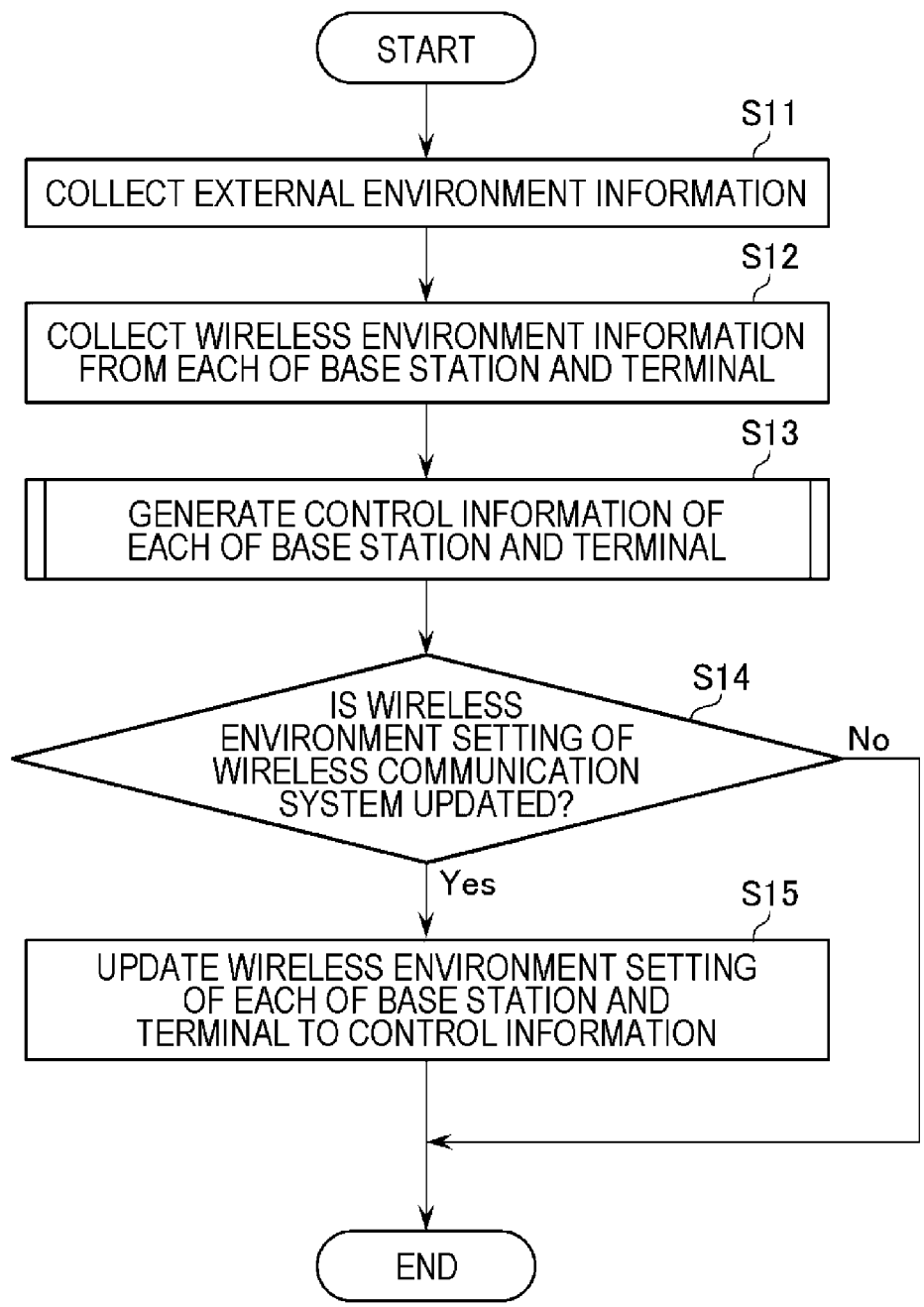
FIG. 9 is a flowchart illustrating an example of a wireless communication management operation in the wireless communication management apparatus according to the embodiment.

Next, an operation of the communication system according to the embodiment will be described. FIG. 9 is a flowchart illustrating an example of a wireless communication management operation in the wireless communication management apparatus according to the embodiment. In FIG. 9, it is assumed that registration information is stored in advance in the memory 102 through a user input. It is assumed that the wireless communication management apparatus 100 has logged in to each device stored in the registration information by SSH.

As illustrated in FIG. 9, when a starting condition of the wireless communication monitoring operation in which a predetermined time interval has passed is satisfied, the wireless communication management apparatus 100 collects external environment information from the external server 400 (S11). The external environment information includes, for example, information regarding weather in a district where the wireless communication system 2 is provided. Then, the wireless communication management apparatus 100 collects the wireless environment information from each of the base station 200 and the terminal 300 (S12). The wireless environment information includes an MTU size and an RSSI. The process of step S12 may be executed before the process of step S11 or may be executed in parallel with the process of step S11.

Then, the wireless communication management apparatus 100 generates control information of each of the base station 200 and the terminal 300 based on the collected external environment information and wireless environment information (S13). Then, the wireless communication management apparatus 100 determines whether to update the wireless environment setting of the wireless communication system 2 (S14). When the wireless environment setting is not updated (No in S14)), the wireless communication management operation ends. On the other hand, when updating the wireless environment setting (Yes in S14), the wireless communication management apparatus 100 updates the wireless environment setting of each of the base station 200 and the terminal 300 to the generated control information (S15). When the process of S15 ends, the wireless communication management operation ends.

Hereinafter, generation of the control information of each of the base station 200 and the terminal 300 by the control information generation unit 113, that is, the process of S13 will be described. In particular, in the following description, processes in the power generation amount prediction unit 121, the remaining capacity prediction unit 122, the time setting unit 123, the difference calculation unit 124, the number-of-frames calculation unit 125, and the traffic amount setting unit 126 will be described with reference to FIG. 8. Through a process to be described below, an operating time, a transmittable time, and a transmittable traffic amount are set for each wireless communication device including the terminal 300 on which the battery 305 and the power generation module 306 is mounted. In the following description, a setting process in one terminal 300 on which the battery 305 and the power generation module 306 are mounted will be described. However, similar setting processes are performed in the other terminals 300 on which the battery 305 and the power generation module 306 are mounted.

The power generation amount prediction unit 121 acquires information regarding weather in a district where the wireless communication system 2 (wireless communication device) is used as one piece of external environment information. The information regarding weather includes the number of days $D_{sun}$ in fine weather forecast from a present time to a time point after a predetermined period (a predetermined number of days) has passed and a ratio $R_{sun}$ of a sunshine time in days other than fine weather forecast (days such as cloudy weather and rainy weather). The power generation amount prediction unit 121 predicts the sunshine time $T_{sun}$ from the present time point to a time point after a predetermined period has passed based on the information regarding weather. Then, the power generation amount prediction unit 121 predicts a power generation amount $G_{pwr}$ from the present time point to a time point after a predetermined period has passed for the terminal 300 on which the battery 305 and the power generation module 306 are mounted based on the predicted sunshine time $T_{sun}$ or the like. Here, when it is assumed that the predetermined period is one week (seven days), the sunshine time $T_{sun}$ is calculated using Expression (1). Then, when an average solar radiation amount H per unit time, a loss coefficient K, a system capacity P, and a margin M considered in calculation are defined, the power generation amount $G_{pwr}$ is calculated from the calculated sunshine time $T_{sun}$ by using Expression (2). The average solar radiation amount H may be different for each season and district, and may be uniform regardless of season and district. The margin M is a weighting factor in consideration of a decrease in a power generation amount due to various reasons.

[Math. 1]

$$T_{sun} = D_{sun} + (7 - D_{sun}) \cdot R_{sun} \qquad (1)$$

$$G_{pwr} = T_{sun} \cdot H \cdot K \cdot P \cdot (M/1) \qquad (2)$$

The remaining capacity prediction unit 122 acquires the power generation amount $G_{pwr}$ predicted by the power generation amount prediction unit 121, and acquires the measurement value $BL_{real}$ as a real-time measurement result of the remaining capacity of the battery 305. Relational data indicating a relationship between the operating time $T_{on}$ and the transmittable time $T_{tx}$ of the terminal 300 with respect to power consumption amount in the terminal 300 is stored in the memory 102 or the like of the wireless communication management apparatus 100. The relational data includes a function or a calculation expression indicating the relationship between the operating time $T_{on}$ and the transmittable time $T_{tx}$ with respect to the power consumption amount.

Here, the operating time $T_{on}$ indicates, for example, a time rate at which the terminal 300 can operate in a reference time and the reference time is, for example, one day (24 hours). The operating time $T_{on}$ is any value in the range from the minimum operating time $T_{onmin}$ to the active operation time $T_{active}$, and the range from the minimum operating time $T_{onmin}$ to the active operation time $T_{active}$ is set as the reference range of the operating time $T_{on}$. The active operation time $T_{active}$ can be designated. When the active operation time $T_{active}$ is not designated, the active operation time $T_{active}$ is set to 1. The transmittable time $T_{tx}$ indicates a time ratio at which the terminal 300 can perform transmission in the reference time, and the reference time is, for example, 1 hour. The transmittable time $T_{tx}$ is any value in the range from the minimum value $T_{txmin}$ to the maximum value $T_{txmax}$, and the range from the minimum value $T_{txmin}$ to the maximum value $T_{txmax}$ is set as the reference range of the transmittable time $T_{tx}$. The reference range of the transmittable time $T_{tx}$ is set to a range that satisfies the restriction of the total transmission time of the terminal based on the laws such as a radio law.

The remaining capacity prediction unit 122 predicts the remaining capacity of the battery 305 at a time point after the predetermined period has passed from the present time point based on at least the predicted power generation amount $G_{pwr}$, the measurement result (measurement value $BL_{real}$) regarding the remaining capacity of the battery 305, and the relational data. At this time, the remaining capacity prediction unit 122 sets a calculation expression for deriving the remaining capacity $BL_{after}$ of the battery 305 at a time point after a predetermined period has passed. In the setting of the calculation expression for deriving the remaining capacity $BL_{after}$, the remaining capacity prediction unit 122 sets a calculation expression for deriving a power consumption amount $C_{pwr}$ in the terminal 300 from the present time point to a time point after the predetermined period has passed from based on the relational data described above.

In the calculation expression for deriving the power consumption amount $C_{pwr}$, the above-described operating time $T_{on}$ and transmittable time $T_{tx}$ are used as variables changing within the above-described reference range. Then, in the calculation expression for deriving the power consumption amount $C_{pwr}$, a power consumption $P_{tx}$ of the terminal 300 at the time of transmission, the power consumption $P_{rx}$ of the terminal 300 at a standby time, and the power consumption $P_{sleep}$ of the terminal 300 at the time of non-operation are used. Here, the standby time is a state in which transmission is not performed from the terminal 300 during an operation. The power consumptions $P_{tx}$, $P_{rx}$, and $P_{sleep}$ are indicated by power consumption during a reference time, for example, indicated by power consumption on a daily basis. When it is assumed that the predetermined period is one week (seven days), a calculation expression for deriving the power consumption amount $C_{pwr}$ from the present time point to after the lapse of the predetermined period is set as in Expression (3).

[Math. 2]

$$C_{pwr} = 7 \cdot \{T_{on}(T_{tx}P_{tx} + (1 - T_{tx})P_{rx}) + (1 - T_{on})P_{sleep}\} = \qquad (3)$$
$$7 \cdot \{T_{tx}(P_{tx} - P_{rx})T_{on} + T_{on}P_{rx} + (1 - T_{on})P_{sleep}\}$$

In the following description, in Expression (3), the power consumption amount $C_{pwr}$ in a case where the operating time $T_{on}$ is the active operation time $T_{active}$ and the transmittable time $T_{tx}$ is the maximum value $T_{txmax}$ is set as a power consumption value $C_{maxpwr}$. In Expression (3), the power consumption amount $C_{pwr}$ in a case where the operating time $T_{on}$ is the active operation time $T_{active}$ and the transmittable time $T_{tx}$ is the minimum value $T_{txmin}$ is set as the power consumption value $C_{minpwr}$. In the generation of the control information at the time of activation of the terminal 300, that is, in the setting of the first transmittable time $T_{tx}$ and the like after activation of the terminal 300, the remaining capacity prediction unit 122 sets a calculation expression for deriving the remaining capacity $BL_{after}$ of the battery 305 at a time point after the predetermined period has passed using the predicted power generation amount $G_{pwr}$, the real-time measurement value $BL_{real}$ of the remaining capacity of the battery 305, and the power consumption amount $C_{pwr}$ of Expression (3) as in Expression (4). The calculation expression for deriving the remaining capacity $BL_{after}$ is set as in Expression (4). Therefore, in the calculation expression for deriving the remaining capacity $BL_{after}$, the above-described operating time $T_{on}$ and transmittable time $T_{tx}$ are used as variables changing within the above-described reference range.

[Math. 3]

$$BL_{after} = BL_{real} + (G_{pwr} - C_{pwr}) \quad (4)$$

The time setting unit 123 sets the operating time $T_{on}$ and the transmittable time $T_{tx}$ included in the control information of the terminal 300. In the setting of the control information (the operating time $T_{on}$, the transmittable time $T_{tx}$, and the like) at the time of activation of the terminal 300, that is, in the setting of the first transmittable time $T_{tx}$ and the like after activation of the terminal 300, the time setting unit 123 sets a condition that a derivation result by Expression (4) is greater than an allowable remaining capacity $BL_{minreq}$ and each of the operating time $T_{on}$ and the transmittable time $T_{tx}$ falls within the above-described reference range. That is, a condition that the remaining capacity $BL_{after}$ of the battery 305 predicted by the remaining capacity prediction unit 122 is greater than the allowable remaining capacity $BL_{minreq}$, and each of the operating time $T_{on}$ and the transmittable time $T_{tx}$ falls within the above-described reference range is set. Accordingly, it is a condition that Expressions (5), (6), and (7) are all satisfied. The allowable remaining capacity $BL_{minreq}$ is set, for example, as a lower limit value or the like of the remaining capacity of the battery at a time point after the predetermined period has passed.

[Math. 4]

$$BL_{minreq} < BL_{real} + (G_{pwr} - C_{pwr}) \quad (5)$$

$$T_{onmin} \leq T_{on} \leq T_{active} \quad (6)$$

$$T_{txmin} \leq T_{tx} \leq T_{txmax} \quad (7)$$

The time setting unit 123 sets the operating time $T_{on}$ and the transmittable time $T_{tx}$ in a state where Expressions (5) to (7) are all satisfied, that is, in a state where the set condition is satisfied. Therefore, the operating time $T_{on}$ and the transmittable time $T_{tx}$ are set to a state in which the remaining capacity $BL_{after}$ of the battery 305 which is the result derived by Expression (4) is greater than the allowable remaining capacity $BL_{minreq}$.

The time setting unit 123 sets each of the operating time $T_{on}$ and the transmittable time $T_{tx}$ to a value as large as possible on the premise that the above-described set condition is satisfied. For example, the time setting unit 123 selects a combination in which a product of the operating time $T_{on}$ and the transmittable time $T_{tx}$ is the largest among the combinations of the operating time $T_{on}$ and the transmittable time $T_{tx}$ satisfying the above-described condition. Then, the time setting unit 123 sets each of the operating time $T_{on}$ and the transmittable time $T_{tx}$ to a value in the selected combination.

In one example, the operating time $T_{on}$ and the transmittable time $T_{tx}$ may be set to a value in a combination in which a linear combination of the operating time $T_{on}$ and the transmittable time $T_{tx}$ by a positive number is the largest among combinations of the operating time $T_{on}$ and the transmittable time $T_{tx}$ satisfying the condition. Here, the linear combination of the operating time $T_{on}$ and the transmittable time $T_{tx}$ by the positive number is a calculated value of $c1 \times T_{on} + c2 \times T_{tx}$ when c1 and c2 are positive numbers.

A monotonically increasing function $f(T_{on})$ that has the operating time $T_{on}$ as a variable and a monotonically increasing function $g(T_{tx})$ that has the transmittable time $T_{tx}$ as a variable are defined. In one example, the operating time $T_{on}$ and the transmittable time $T_{tx}$ may be set to a value in a combination in which a product of the monotonically increasing functions $f(T_{on})$ and $g(T_{tx})$ is the largest among the combinations of the operating time $T_{on}$ and the transmittable time $T_{tx}$ satisfying the condition. In one example, the operating time $T_{on}$ and the transmittable time $T_{tx}$ may be set to a value in a combination in which the linear combination of the monotonically increasing functions $f(T_{on})$ and $g(T_{tx})$ by a positive number is the largest among the combinations of the operating time $T_{on}$ and the transmittable time $T_{tx}$ satisfying the condition.

In one example, one of the operating time $T_{on}$ and the transmittable time $T_{tx}$ may be set to a constant value. In this case, one of the operating time $T_{on}$ and the transmittable time $T_{tx}$ which is not a constant value is set to the maximum value among the values satisfying the above-described condition.

In one example in which the predetermined period is one week, the time setting unit 123 determines whether Expression (8) is satisfied. When Expression (8) is satisfied, the time setting unit 123 sets the operating time $T_{on}$ and the transmittable time $T_{tx}$ as in Expression (9). When Expression (8) is not satisfied, the time setting unit 123 determines whether Expression (10) is satisfied. When Expression (10) is satisfied, the time setting unit 123 sets the operating time $T_{on}$ and the transmittable time $T_{tx}$ as in Expression (11). When Expression (10) is not satisfied, the time setting unit 123 determines whether Expression (12) is satisfied. When Expression (12) is satisfied, the time setting unit 123 sets the operating time $T_{on}$ and the transmittable time $T_{tx}$ as in Expression (13). When Expression (12) is not satisfied, the time setting unit 123 sets the operating time $T_{on}$ and the transmittable time $T_{tx}$ as in Expression (14).

[Math. 5]

$$BL_{real} > BL_{minreq} - G_{pwr} + C_{maxpwr} \quad (8)$$

$$T_{tx} = T_{txmax}, \quad (9)$$

$$T_{on} = T_{active}$$

$$BL_{real} > BL_{minreq} - G_{pwr} + C_{minpwr} \quad (10)$$

$$T_{tx} = \frac{BL_{real} - BL_{minreq} + G_{pwr} - 7\{T_{on}P_{rx} + (1 - T_{on})P_{sleep}\}}{7T_{on}(P_{tx} - P_{rx})}, \quad (11)$$

$$T_{on} = T_{active}$$

$$T_{onmin} < \frac{BL_{real} - BL_{minreq} + G_{pwr} - 7P_{sleep}}{7(T_{txmin}P_{tx} + (1 - T_{txmin})P_{rx}) - P_{sleep}} \quad (12)$$

$$T_{tx} = T_{txmin}, \quad (13)$$

$$T_{on} = \frac{BL_{real} - BL_{minreq} + G_{pwr} - 7P_{sleep}}{7(T_{txmin}P_{tx}(1 - T_{txmin})P_{rx}) - P_{sleep}}$$

$$T_{tx} = T_{txmin}, \quad (14)$$

$$T_{on} = T_{onmin}$$

When the operating time $T_{on}$ and the transmittable time $T_{tx}$ are set as described above, the remaining capacity prediction unit 122 predicts the remaining capacity $BL_{after}$ of the battery 305 at a time point after the predetermined period has passed by using the setting values of the operating time $T_{on}$ and the transmittable time $T_{tx}$ and Expression (4). Further, the remaining capacity prediction unit 122 also predicts a change over time in the remaining capacity of the battery 305 until the predetermined period has passed from the present time point. Even after the time setting unit 123 sets the operating time $T_{on}$ and the transmittable time $T_{tx}$, a change over time of the remaining capacity and the remaining capacity of the battery 305 is measured. The difference calculation unit 124 calculates a difference $A_{pwr}$ between the measurement result and the prediction result predicted at the time of setting regarding the remaining capacity of the battery 305 after the time of setting by the time setting unit 123. In addition, the difference calculation unit 124 calculates the change over time of the difference $A_{pwr}$ after the setting by the time setting unit 123.

The generation of the control information including the setting of the operating time $T_{on}$ and the transmittable time $T_{tx}$ may be performed again even after first generation is performed. In this case, the control information from the second time on is generated after the start of the terminal 300. The operating time $T_{on}$ and the transmittable time $T_{tx}$ are also set by the time setting unit 123 when the control information from the second time on is generated. Here, in each setting from the second time by the time setting unit 123 after the activation of the terminal 300, the transmittable time $T_{tx}$ and the like are set in consideration of the change over time of the difference $A_{pwr}$ described above. The difference $A_{pwr}$ is expressed by a difference in power between reference times, for example, a difference in power on a daily basis.

In the generation of the control information from the second time on after the activation of the terminal 300, the remaining capacity prediction unit 122 predicts the remaining capacity $BL_{after}$ of the battery 305 at the time point after the predetermined period has passed from the present time point in consideration of an influence of the change over time of the difference $A_{pwr}$ after the previous setting. Therefore, in addition to the predicted power generation amount $G_{pwr}$, the real-time measurement value $BL_{real}$ of the remaining capacity of the battery 305, and the power consumption amount $C_{pwr}$ of Expression (3), the remaining capacity prediction unit 122 sets a calculation expression for deriving the remaining capacity $BL_{after}$ of the battery 305 at the time point after the predetermined period has passed using a parameter related to a change over time of the difference $A_{pwr}$ after the previous setting (when the previous control signal is generated).

In one example, the difference calculation unit 124 calculates the above-described difference $A_{pwr}$ at a plurality of time points between the previous setting by the time setting unit 123 and the real-time setting. Then, the remaining capacity prediction unit 122 uses the average value $A_{pwrav}$ of the differences $A_{pwr}$ at a plurality of time points as a parameter related to the change over time of the difference $A_{pwr}$ and sets a calculation expression for deriving the remaining capacity $BL_{after}$ of the battery 305 at the time point after the predetermined period has passed. Therefore, in the setting of the control information (the operating time $T_{on}$ and the transmittable time $T_{tx}$) from the second time on, a calculation expression for deriving the remaining capacity $BL_{after}$ of the battery 305 at the time point after the predetermined period has passed is set as in Expression (15). In Expression (15), like Expression (4) used for the first setting, the operating time $T_{on}$ and the transmittable time $T_{tx}$ are used as variables changing within the reference range described above.

[Math. 6]

$$BL_{after} = BL_{real} + (G_{pwr} - C_{pwr}) - A_{pwrav} \tag{15}$$

In each of the generation of the control information from the second time on, the time setting unit 123 sets a condition that the derivation result by Expression (15) is greater than the allowable remaining capacity $BL_{minreq}$, and each of the operating time $T_{on}$ and the transmittable time $T_{tx}$ falls within the above-described reference range. Therefore, even in the setting from the second time on, a condition that the remaining capacity $BL_{after}$ of the battery 305 predicted by the remaining capacity prediction unit 122 is greater than the allowable remaining capacity $BL_{minreq}$, and each of the operating time $T_{on}$ and the transmittable time $T_{tx}$ falls within the above-described reference range is set. In the setting of the operating time $T_{on}$ and the transmittable time $T_{tx}$ from the second time on, a condition that Expressions (16), (17), and (18) are all satisfied is set.

[Math. 7]

$$BL_{minreq} < BL_{real} + (G_{pwr} - C_{pwr}) - A_{pwrav} \tag{16}$$

$$T_{onmin} \leq T_{on} \leq T_{active} \tag{17}$$

$$T_{txmin} \leq T_{tx} \leq T_{txmax} \tag{17}$$

Then, the time setting unit 123 sets the operating time $T_{on}$ and the transmittable time $T_{tx}$ in a state where Expressions (16) to (18) are all satisfied, that is, in a state where the set conditions are satisfied. Therefore, the operating time $T_{on}$ and the transmittable time $T_{tx}$ are set in a state in which the remaining capacity $BL_{after}$ of the battery 305 which is the result of the derivation by Expression (15) is greater than the allowable remaining capacity $BL_{minreq}$. In the generation of the control information from the second time on, the time setting unit 123 also sets each of the operating time $T_{on}$ and the transmittable time $T_{tx}$ to a value as large as possible on the premise that the set conditions described above are satisfied. For example, each of the operating time $T_{on}$ and the transmittable time $T_{tx}$ is set to a value in a combination in which a product of the operating time $T_{on}$ and the transmittable time $T_{tx}$ is the largest among combinations of the operating time $T_{on}$ and the transmittable time $T_{tx}$ satisfying the above-described conditions.

The operating time $T_{on}$ and the transmittable time $T_{tx}$ may be set to any one of a value in a combination in which the linear combination of the operating time $T_{on}$ and the transmittable time $T_{tx}$ by the positive number is the largest, a value in a combination in which the product of the monotonically increasing functions $f(T_{on})$ and $g(T_{tx})$ is the largest, and a value in a combination in which the linear combination of the monotonically increasing functions $f(T_{on})$ and $g(T_{tx})$ by the positive number is the largest as described above among the combinations satisfying the condition. One of the operating time $T_{on}$ and the transmittable time $T_{tx}$ may be set to a constant value, and one of the operating time $T_{on}$ and the transmittable time $T_{tx}$ that is not the constant value may be set to a maximum value among the values satisfying the above-described conditions.

In one example in which the predetermined period is one week, the time setting unit 123 determines whether Expression (19) is satisfied. When Expression (19) is satisfied, the time setting unit 123 sets the operating time $T_{on}$ and the transmittable time $T_{tx}$ as in Expression (20). When Expression (19) is not satisfied, the time setting unit 123 determines whether Expression (21) is satisfied. When Expression (21) is satisfied, the time setting unit 123 sets the operating time $T_{on}$ and the transmittable time $T_{tx}$ as in Expression (22). When Expression (21) is not satisfied, the time setting unit 123 determines whether Expression (23) is satisfied. When Expression (23) is satisfied, the time setting unit 123 sets the operating time $T_{on}$ and the transmittable time $T_{tx}$ as in Expression (24). When Expression (23) is not satisfied, the time setting unit 123 sets the operating time $T_{on}$ and the transmittable time $T_{tx}$ as in Expression (25).

[Math. 8]

$$BL_{real} > BL_{minreq} - G_{pwr} + A_{pwrav} + C_{maxpwr} \quad (19)$$

$$T_{tx} = T_{txmax}, \quad (20)$$

$$T_{on} = T_{active}$$

$$BL_{real} > BL_{minreq} - G_{pwr} + A_{pwrav} + C_{minpwr} \quad (21)$$

$$T_x = \frac{BL_{real} - BL_{minreq} + G_{pwr} - A_{pwrav} - 7\{T_{on}P_{rx} + (1 - T_{on})P_{sleep}\}}{7T_{on}(P_{tx} - P_{rx})}, \quad (22)$$

$$T_{on} = T_{active}$$

$$T_{onmin} < \frac{BL_{real} - BL_{minreq} + G_{pwr} - A_{pwrav} - 7P_{sleep}}{7(T_{txmin}P_{tx} + (1 - T_{txmin})P_{rx}) - P_{sleep}} \quad (23)$$

$$T_{tx} = T_{txmin}, \quad (24)$$

$$T_{on} = \frac{BL_{real} - BL_{minreq} + G_{pwr} - A_{pwrav} - 7P_{sleep}}{7(T_{txmin}P_{tx} + (1 - T_{txmin})P_{rx}) - P_{sleep}}$$

$$T_{tx} = T_{txmin}, \quad (25)$$

$$T_{on} = T_{onmin}$$

When the time setting unit 123 sets the operating time $T_{on}$ and the transmittable time $T_{tx}$ as described above in each of the first time and the second subsequent times of the control information, the number-of-frames calculation unit 125 acquires the set transmittable time $T_{tx}$. The number-of-frames calculation unit 125 acquires the MTU size, the MCS, and an aggregation number (maximum aggregation number) $N_{agg}$ between the terminal 300 and a transmission destination from the collected wireless environment information and the like.

Each of the MTU size, the MCS, and the aggregation number $N_{agg}$ between the terminal 300 and the transmission destination is obtained by, for example, the foregoing collection of wireless environment information. In one example, a designated value may be used as any of the MTU size, the MCS, and the aggregation number $N_{agg}$ between the terminal 300 and the transmission destination. A unit of the MTU size is, for example, [byte].

The number-of-frames calculation unit 125 calculates a frame time length $D_{data}$ between the terminal 300 and the transmission destination based on the MTU size, the MCS, and the aggregation number $N_{agg}$. The unit of the frame time length $D_{data}$ is, for example, [μsec], and the frame time length $D_{data}$ is calculated as in Expression (26), for example. In Expression (26), a PHY data rate $R_{data}$, a PHY header time length PHYheaderTime, a frame size $L_{data}$ with respect to a transmission destination, a MAC header size MACHeader, a MAC protocol data unit (MPDU) delimiter size MPDUdelimiter, a frame check sequence (FCS) size FCS, a tail size TailBit, and a time length SymbolLength of 1 orthogonal frequency division multiplexing (OFDM) symbol are defined as parameters.

[Math. 9]

$$D_{data} = PHYHeaderTime + \text{ceil}\left(\frac{[\{MACHeader + N_{agg} * (MPDUDelimiter + L_{data}) + FCS\} * 8 + TailBit]}{R_{data}}, SymbolLength\right) \quad (26)$$

Here, the PHY data rate $R_{data}$ is determined based on the MCS with the transmission destination. The above-described value of the MTU size is used as the frame size $L_{data}$, and the unit is, for example, [byte]. The time length PHYheaderTime of the PHY header, the size MACHeader of the MAC header, the size MPDUdelimiter of the MPDU delimiter, the size FCS of the FCS, the size TailBit of the tail, and the time length SymbolLength of one OFDM symbol are set values. The unit of the time length PHYheaderTime of the PHY header and the time length SymbolLength of one OFDM symbol is, for example, [μsec], a unit of the size MACHeader of the MAC header, the size MPDUdelimiter of the MPDU delimiter, and the size FCS of the FCS is, for example, [byte], and a unit of the size TailBit of the tail is, for example, [bit]. In Expression (26), a ceiling function is used, and the time length SymbolLength of one OFDM symbol is a reference value of the ceiling function. Therefore, in the ceiling function of Expression (26), the calculated numerical value is rounded up to a multiple of the time length SymbolLength of one OFDM symbol.

The number-of-frames calculation unit 125 calculates the number of frames $N_F$ that can be transmitted by the terminal 300 based on the frame time length $D_{data}$ calculated by Expression (26) or the like, the number of aggregations $N_{agg}$ between the terminal 300 and the transmission destination, and the transmittable time $T_{tx}$ set by the time setting unit 123. The number of frames $N_F$ is calculated, for example, as in Expression (27). The number of frames $N_F$ is indicated by, for example, the number of frames that can be transmitted per unit time, and Expression (27) indicates the number of frames that can be transmitted per second.

[Math. 10]

$$N_F = 10^6 \cdot T_{tx} \cdot \frac{N_{agg}}{D_{data}} \quad (27)$$

The traffic amount setting unit 126 converts the number of frames $N_F$ that can be transmitted by the terminal 300 calculated by the number-of-frames calculation unit 125 into a traffic amount $G_{traffic}$. The traffic amount setting unit 126 converts the number of frames $N_F$ into the traffic amount $G_{traffic}$ by Expression (28), for example, using the above-described frame size $L_{data}$. When the number of frames $N_F$ is the number of frames per second, the unit of the traffic amount $G_{traffic}$ calculated by Expression (28) is, for example, [bps].

[Math. 11]

$$G_{traffic} = N_F \cdot L_{data} \quad (28)$$

The traffic amount setting unit 126 determines whether the traffic amount $G_{traffic}$ converted by Expression (28) or the like is smaller than the reference traffic amount $G_{trafficref}$. The reference traffic amount $G_{trafficref}$ is set as, for example, an upper limit value of the traffic amount that can be transmitted by the terminal 300. When the converted traffic amount $G_{traffic}$ is less than the reference traffic amount $G_{trafficref}$, the traffic amount setting unit 126 sets the converted traffic amount $G_{traffic}$ as the traffic amount that can be transmitted by the terminal 300. On the other hand, when the converted traffic amount $G_{traffic}$ is equal to or more than the reference traffic amount $G_{trafficref}$, the traffic amount setting unit 126 sets the reference traffic amount $G_{trafficref}$ as the traffic amount that can be transmitted by the terminal 300.

By performing the above-described process, in the present embodiment, the operating time $T_{on}$, the transmittable time $T_{tx}$, and the transmittable traffic amount of the terminal 300 are set whenever the control information of the terminal 300 is set. The operating time $T_{on}$ is set as a parameter related to a macro-schedule of the terminal 300, and the transmittable time $T_{tx}$ and the transmittable traffic amount are set as parameters related to a micro-schedule of the terminal 300.

For the terminal 300 on which the battery 305 and the power generation module 306 are not mounted, the time setting unit 123 sets the operating time $T_{on}$ to the active operation time $T_{active}$ and sets the transmittable time $T_{tx}$ to the maximum value $T_{txmax}$ in the setting of the setting information. Then, like the terminal 300 on which the battery 305 and the power generation module 306 are mounted, the traffic amount setting unit 126 or the like sets the transmittable traffic amount based on the set transmittable time $T_{tx}$. In addition, since the battery 305 is not mounted on the base station 200, the operating time $T_{on}$, the transmittable time $T_{tx}$, and the transmittable traffic amount are set like the terminal 300 on which the battery 305 and the power generation module 306 are not mounted.

Figure 10:
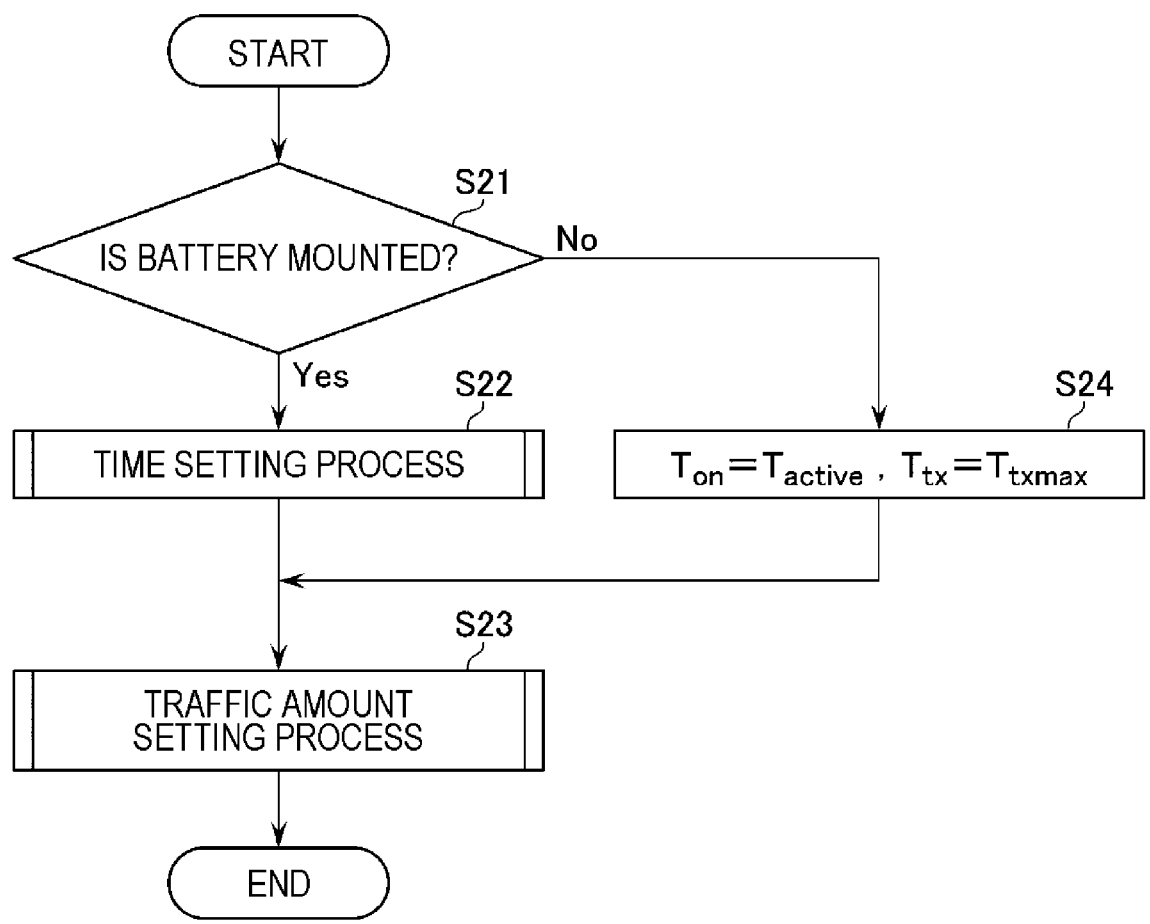
FIG. 10 is a flowchart illustrating an example of a process of generating control information for one target terminal performed by the wireless communication management apparatus according to the embodiment.

FIG. 10 is a flowchart illustrating an example of a process of generating control information for one target terminal performed by the wireless communication management apparatus according to the embodiment. In particular, FIG. 10 illustrates an example of the above-described process of setting the operating time $T_{on}$, the transmittable time $T_{tx}$, and the transmittable traffic amount in the target terminal. The process of FIG. 10 is performed as a part of the process of S13 of FIG. 9.

As illustrated in FIG. 10, in the generation of the control information of the target terminal 300, the wireless communication management apparatus 100 determines whether the battery 305 is mounted on the target terminal 300 (S21). When the battery 305 is mounted on the terminal 300 (Yes in S21), the wireless communication management apparatus 100 performs a time setting process of S22 and then performs a traffic amount setting process of S23. Conversely, when the battery 305 is not mounted on the terminal 300 (No in S21), the wireless communication management apparatus 100 sets the operating time $T_{on}$ as the active operation time $T_{active}$ and sets the transmittable time $T_{tx}$ as the maximum value $T_{txmax}$ for the target terminal 300 (S24). Then, the wireless communication management apparatus 100 performs the traffic amount setting process of S23.

Figure 11:
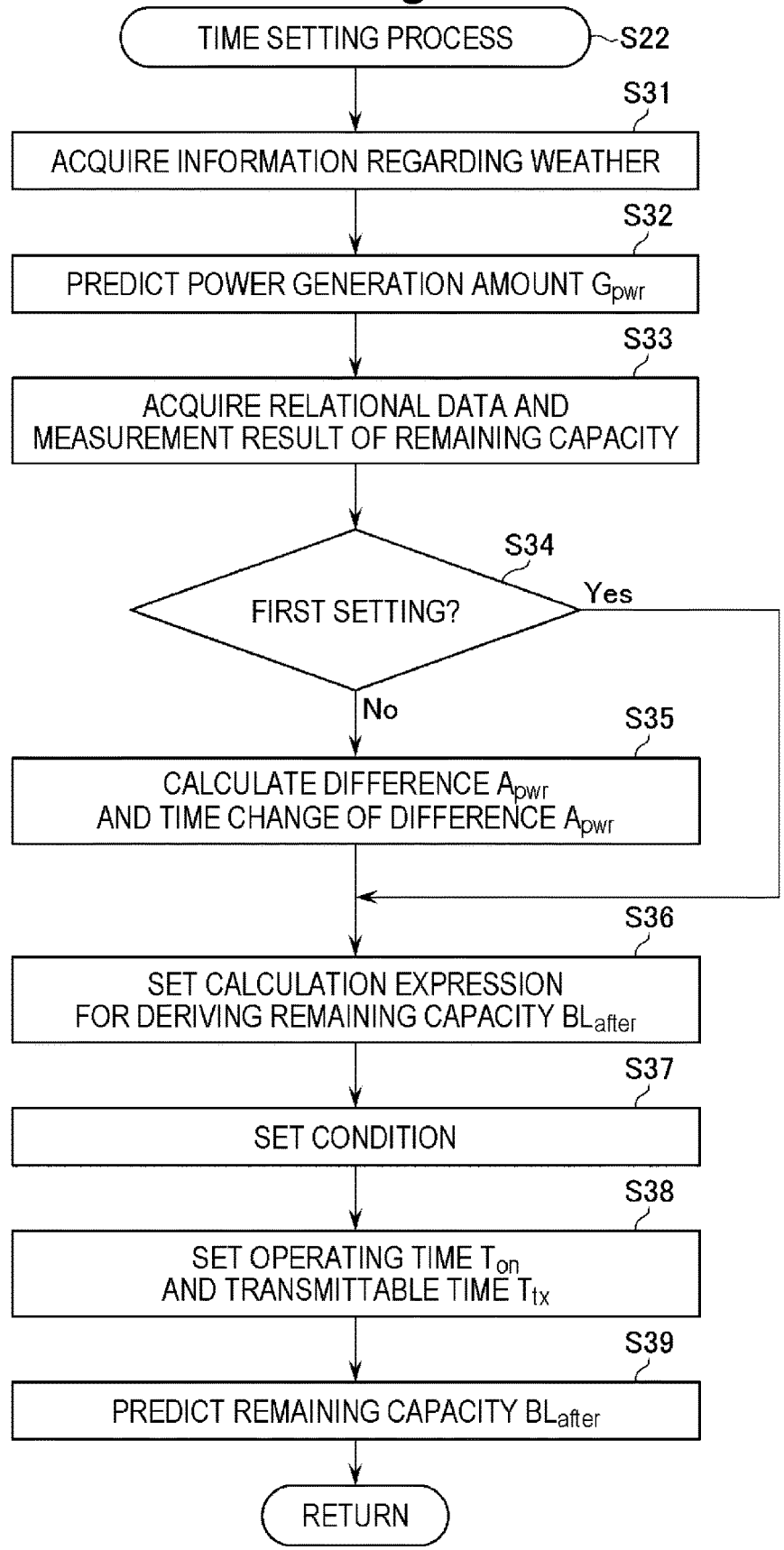
FIG. 11 is a flowchart illustrating an example of a time setting process in FIG. 10.

FIG. 11 is a flowchart illustrating an example of the time setting process of FIG. 10. The time setting process illustrated in FIG. 11 is performed only for the terminal 300 (wireless communication device) on which the battery 305 is mounted. Then, a macro-schedule is generated for the target terminal 300 on which the battery 305 is mounted through the time setting process of S22.

As illustrated in FIG. 11, in the time setting process, as described above, the wireless communication management apparatus 100 (power generation amount prediction unit 121) acquires information regarding weather of a district where the wireless communication system 2 is provided (S31) and predicts the power generation amount $G_{pwr}$ from the present time point to the time point after the elapse of the predetermined period based on the information regarding the weather or the like (S32). Then, the wireless communication management apparatus 100 acquires the relational data indicating the relationship between the operating time $T_{on}$ and the transmittable time $T_{tx}$ of the terminal 300 with respect to the power consumption amount of the terminal 300, and the measurement result of the remaining capacity of the battery 305 (S33). Then, the wireless communication management apparatus 100 determines whether the first operating time $T_{on}$ and the transmittable time $T_{tx}$ after the start of the terminal 300 are first set, that is, whether the control information of the first time is generated (S34).

When the setting is the first time (Yes in S34), the wireless communication management apparatus 100 (remaining capacity prediction unit 122) sets a calculation expression for deriving the remaining capacity $BL_{after}$ of the battery 305 at the time point after the predetermined period has passed based on the predicted power generation amount $G_{pwr}$, the relational data, and the measurement result of the remaining capacity of the battery 305 (S36). At this time, for example, Expression (4) described above is set. On the other hand, when the setting is the second time or later (No in S34), as described above, the wireless communication management apparatus 100 (difference calculation unit 124) calculates the difference $A_{pwr}$ between the measurement result and the predicted prediction result of the remaining capacity of the battery 305 and calculates the change over time of the difference $A_{pwr}$ after the previous setting (S35). Then, in addition to the predicted power generation amount $G_{pwr}$, the relational data, and the measurement result of the remaining capacity of the battery 305, the wireless communication management apparatus 100 (remaining capacity prediction unit 122) sets a calculation expression for deriving the remaining capacity $BL_{after}$ of the battery 305 at the time point after the predetermined period has passed based on the change over time of the difference $A_{pwr}$ after the previous setting (S36). At this time, for example, Expression (15) described above is set.

Then, the wireless communication management apparatus 100 (time setting unit 123) sets a condition related to the setting of the operating time $T_{on}$ and the transmittable time $T_{tx}$ based on the calculation expression and the like set in S36 (S37). At this time, a condition that the predicted remaining capacity $BL_{after}$ of the battery 305 is greater than the allowable remaining capacity $BL_{minreq}$, and each of the operating time $T_{on}$ and the transmittable time $T_{tx}$ is within the reference range is set. Therefore, in the first setting, for example, a condition that Expressions (5) to (7) are all satisfied is set. In the settings from the second time on, for example a condition that Expressions (16) to (18) are all satisfied is set.

Then, the wireless communication management apparatus 100 (time setting unit 123) sets the operating time $T_{on}$ and the transmittable time $T_{tx}$ of the terminal 300 in a state where the set conditions are satisfied (S38). At this time, the wireless communication management apparatus 100 sets each of the operating time $T_{on}$ and the transmittable time $T_{tx}$ to a value as large as possible on the premise that the set condition is satisfied. Then, the wireless communication management apparatus 100 (remaining capacity prediction unit 122) predicts the remaining capacity $BL_{after}$ of the battery 305 at the time point after the predetermined period has passed using the calculation expression set in S36 and the operating time $T_{on}$ and the transmittable time $T_{tx}$ set in S38 (S39).

Figure 12:
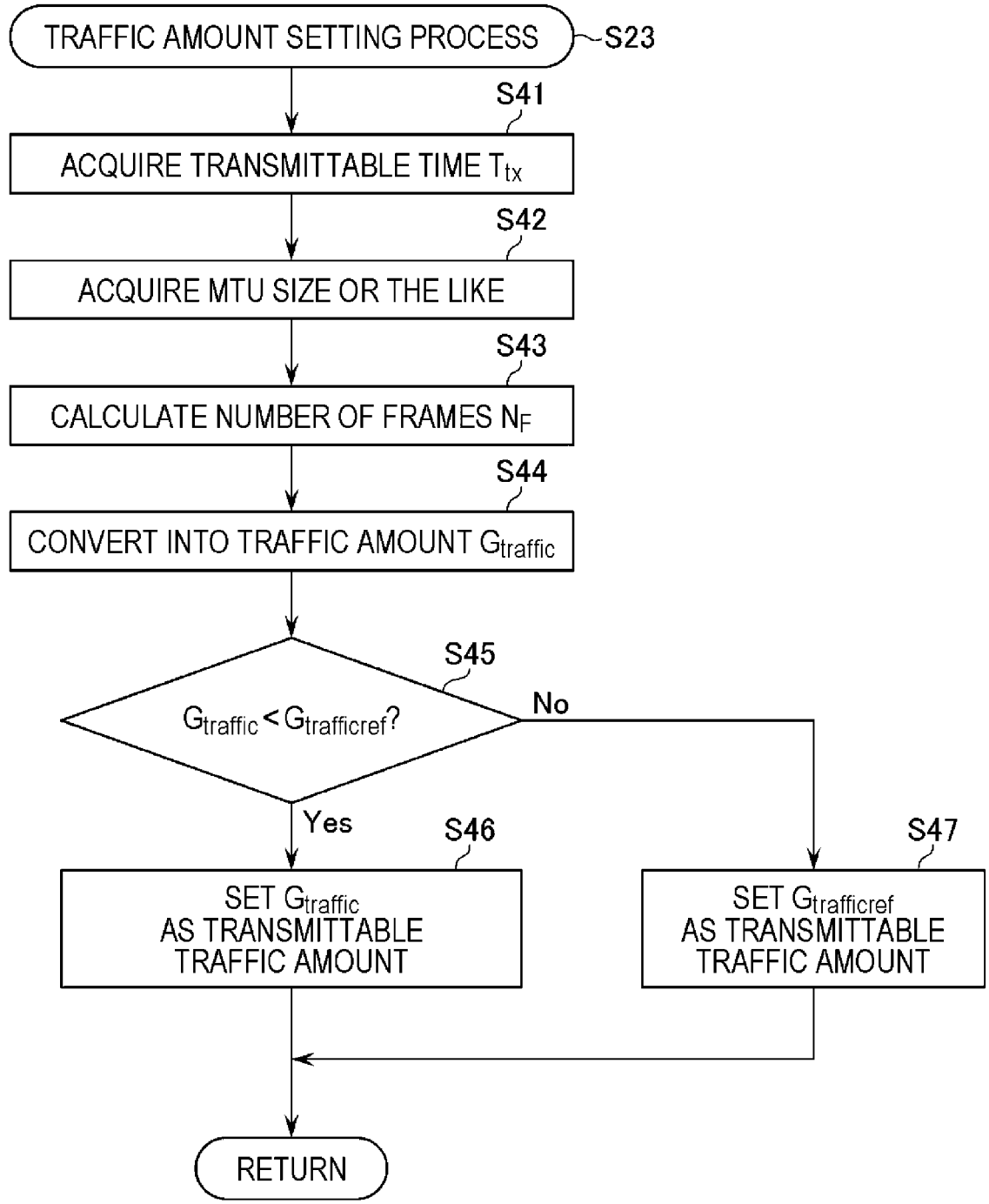
FIG. 12 is a flowchart illustrating an example of a traffic amount setting process in FIG. 10.

FIG. 12 is a flowchart illustrating an example of the traffic amount setting process of FIG. 10. The traffic amount setting process illustrated in FIG. 12 is performed for all the terminals 300 (wireless communication devices) regardless of whether the battery 305 is mounted. Then, the micro-schedule is generated for the target terminal 300 through the time setting process in S23.

As illustrated in FIG. 12, in the traffic amount setting process, the wireless communication management apparatus 100 (the number-of-frames calculation unit 125) acquires the transmittable time $T_{tx}$ set in the time setting process as described above (S41), and acquires the MTU size and the like between the target terminal 300 and the transmission destination (S42). Then, the wireless communication management apparatus 100 (number-of-frames calculation unit 125) calculates the number of frames $N_F$ that can be transmitted by the terminal 300, as described above, based on the transmittable time $T_{tx}$, the MTU size, and the like (S43). Then, the wireless communication management apparatus 100 (traffic amount setting unit 126) converts the calculated number of frames $N_F$ that can be transmitted by the terminal 300 into the traffic amount $G_{traffic}$ (S44).

Then, the wireless communication management apparatus 100 (traffic amount setting unit 126) determines whether the converted traffic amount $G_{traffic}$ is less than the reference traffic amount $G_{trafficref}$ (S45). When the converted traffic amount $G_{traffic}$ is less than the reference traffic amount $G_{trafficref}$ (Yes in S45), the wireless communication management apparatus 100 (traffic amount setting unit 126) sets the converted traffic amount $G_{traffic}$ as the traffic amount that can be transmitted by the terminal 300 (S46). Conversely, when the converted traffic amount $G_{traffic}$ is equal to or more than the reference traffic amount $G_{trafficref}$ (No in S45), the wireless communication management apparatus 100 (traffic amount setting unit 126) sets the reference traffic amount $G_{trafficref}$ as the traffic amount that can be transmitted by the terminal 300 (S47).

As described above, in the present embodiment, the wireless communication management apparatus 100 sets the remaining capacity $BL_{after}$ of the battery 305 at the time point after the predetermined period has passed in the terminal 300 (wireless communication device) on which the battery 305 is mounted. Then, the wireless communication management apparatus 100 sets the operating time $T_{on}$ and the transmittable time $T_{tx}$ of the terminal 300 to a state where the condition that the predicted remaining capacity $BL_{after}$ of the battery 305 is greater than the allowable remaining capacity $BL_{minreq}$ and each of the operating time $T_{on}$ and the transmittable time $T_{tx}$ of the terminal 300 is within the reference range is satisfied. The terminal 300 is controlled based on the control information including the operating time $T_{on}$ and the transmittable time $T_{tx}$ set as described above. Therefore, in the present embodiment, in the terminal 300 on which the battery 305 is mounted, the constraint on a transmission time is complied with and the operating time and the transmission time are controlled in accordance with the remaining capacity of the battery 305. Since the operating time and the transmission time are controlled in accordance with the remaining capacity of the battery 305, communication stop or the like caused by a lack of remaining capacity of the battery 305 is effectively prevented in the terminal 300.

In the present embodiment, the wireless communication management apparatus 100 sets each of the operating time $T_{on}$ and the transmittable time $T_{tx}$ to a largest possible value on the premise that the set conditions are satisfied. Therefore, even if the operating time and the transmission time are controlled in accordance with the remaining capacity of the battery 305, the transmission time is inhibited from being excessively shortened and a traffic amount to be transmitted is inhibited from being excessively reduced in the terminal 300.

In the present embodiment, the wireless communication management apparatus 100 predicts the power generation amount $G_{pwr}$ in the terminal 300 until the time point after the predetermined period has passed based on the information regarding weather of a district in which the terminal 300 is used, and predicts the remaining capacity $BL_{after}$ of the battery 305 at the time point after the predetermined period has passed based on the predicted power generation amount $G_{pwr}$. Since the power generation amount $G_{pwr}$ is predicted based on the information regarding the weather, the power generation amount $G_{pwr}$ in the terminal 300 is appropriately predicted, and the remaining capacity $BL_{after}$ of the battery 305 at the time point after the predetermined period has passed is appropriately predicted. As a result, the operating time $T_{on}$ and the transmittable time $T_{tx}$ are set to appropriate values.

In the present embodiment, the wireless communication management apparatus 100 calculates the difference $A_{pwr}$ between the measurement result and the prediction result predicted at the time of setting and the change over time of the difference $A_{pwr}$ in regard to the remaining capacity of the battery 305. Then, in the settings from the second time on after the terminal 300 starts, the wireless communication management apparatus 100 predicts the remaining capacity $BL_{after}$ of the battery 305 at the time point after the predetermined period has passed based on the change over time of the difference $A_{pwr}$ after the previous setting. Therefore, the remaining capacity $BL_{after}$ of the battery 305 at the time point after the predetermined period has passed is more appropriately predicted, and the operating time $T_{on}$ and the transmittable time $T_{tx}$ are set to more appropriate values.

In the present embodiment, the wireless communication management apparatus 100 sets the number of frames $N_F$ that can be transmitted by the terminal 300 and the traffic amount that can be transmitted by the terminal 300 based on the transmittable time $T_{tx}$ set as described above. Accordingly, the traffic amount that can be transmitted by the terminal 300 is also set to an appropriate value. In addition, when the traffic amount $G_{traffic}$ calculated based on the transmittable time $T_{tx}$ is equal to or more than the reference traffic amount $G_{trafficref}$, the wireless communication management apparatus 100 sets the reference traffic amount $G_{trafficref}$ as the traffic amount that can be transmitted by the terminal 300. Therefore, the traffic amount transmitted from the terminal 300 is inhibited from excessively increasing.

Hereinafter, modifications of the embodiment will be described. In the embodiment described above, the terminal 300 and the base station 200 are assumed to wirelessly communicate directly. On the other hand, the terminal 300 and the base station 200 may be configured to perform wireless communication via a base station (relay base station) that relays wireless communication.

In this case, a battery and a power generation module may be mounted on one or more base stations (relay base stations) to perform relay. For the base station on which the battery and the power generation module are mounted, the operating time $T_{on}$ and the transmittable time $T_{tx}$ are set like the terminal 300 on which the battery 305 and the power generation module 306 are mounted. Then, like the above-described embodiment, the traffic amount that can be transmitted by the base station is set based on the transmittable time $T_{tx}$. That is, the operating time $T_{on}$ and the transmittable time $T_{tx}$ can be set for the wireless communication device (terminal and base station) on which the battery is mounted, like the above-described embodiment and the like.

For example, in the above-described embodiment, the case where the wireless communication management program is executed by the on-premises wireless communication management apparatus 100 has been described, but it is not limited thereto. For example, the wireless communication management program may be executed on calculation resources on a cloud.

For example, in the above-described embodiment, the case where the wireless communication management apparatus 100 is connected to the base station 200 via the network NW has been described, but it is not limited thereto. For example, the wireless communication management apparatus 100 may be provided in the wireless communication system 2 and function as the base station 200 of a root. In this case, the wireless communication management apparatus 100 may be configured to have both the functional configurations illustrated in FIGS. 5 and 8 and the functional configuration illustrated in FIG. 6.

In the above-described embodiment, the case where the battery of the wireless communication device is charged through solar power generation has been described, but it is not limited thereto. For example, even when the battery of the wireless communication device is charged through wind power generation, hydraulic power generation, or the like, it is possible to predict the remaining capacity of the battery at the time point after the predetermined period has passed by predicting the power generation amount in the wireless communication device until the time point after the predetermined period has passed, like the above-described embodiment. Therefore, even when the battery of the wireless communication device is charged through wind power generation, hydraulic power generation, or the like, it is possible to set the operating time and the transmittable time of the wireless communication device as in the above-described embodiment.

The present invention is not limited to the foregoing embodiment, and various modifications can be made within the scope of the present invention in implement stages without departing from the gist of the present invention. The embodiments may be combined appropriately. In that case, the combined effects can be obtained. Further, the foregoing embodiments include various inventions, and various inventions can be extracted by a combination selected from a plurality of disclosed constituents. For example, even if the problem can be solved and the effect can be obtained despite of deletion of some constituents from all the constituents described in the embodiments, the configurations from which the constituents are deleted can be extracted as the invention.

REFERENCE SIGNS LIST

1 Communication system
2 Wireless communication system
100 Wireless communication management apparatus
200-1, 200-2 Base station
300-1, 300-2, 300-3 Terminal
400 External server
500 Data server
101, 201, 301 Control circuit
102, 202, 302 Memory
103, 203 Wired communication module
104 User interface
105 Timer
106 Drive
107 Storage medium
204, 303 Wireless communication module
304 Sensor
305 Battery
306 Power generation module
111 User input unit
112, 211 Wired signal reception unit
113 Control information generation unit
114 Determination unit
115, 215 Wired signal transmission unit
116 Command library
121 Power generation amount prediction unit
122 Remaining capacity prediction unit
123 Time setting unit
124 Difference calculation unit
125 Number-of-frames calculation unit
126 Traffic amount setting unit
212, 311 Wireless signal reception unit
213, 312 Collection unit
214, 313 Updating unit
216, 314 Wireless signal transmission unit

The invention claimed is:

1. A wireless communication management apparatus comprising processing circuitry, the processing circuitry is configured to:
   predict a remaining capacity of a battery at a time point after a predetermined period has passed in a wireless communication device on which the battery is mounted;
   set a condition that the predicted remaining capacity of the battery is greater than an allowable remaining capacity and each of an operating time and a transmittable time of the wireless communication device falls within a reference range and set the operating time and the transmittable time of the wireless communication device in a state in which the condition is satisfied;
   calculate the number of frames that the wireless communication device is able to transmit based on a modulation and coding scheme (MCS), a maximum transmission unit (MTU) size, and an aggregation number between the wireless communication device and a transmission destination, and the set transmittable time; and
   convert the calculated number of transmittable frames into a traffic amount and set the traffic amount which the wireless communication device is able to transmit based on the converted traffic amount.

2. The wireless communication management apparatus according to claim 1, wherein the processing circuitry is configured to set each of the operating time and the transmittable time to a value as large as possible on a premise that the condition is satisfied.

3. The wireless communication management apparatus according to claim 2, wherein the processing circuitry is configured to set one of the operating time and the transmittable time to a constant value and set one of the operating time and the transmittable time that is not the constant value to a maximum value among values satisfying the condition.

4. The wireless communication management apparatus according to claim 1, wherein the processing circuitry is configured to:
   set a calculation expression for deriving the remaining capacity of the battery at the time point after the predetermined period has passed by using the operating time and the transmittable time of the wireless communication device as variables, and set the operating time and the transmittable time of the wireless communication device to a state in which a derivation result of the calculation expression is greater than the allowable remaining capacity.

5. The wireless communication management apparatus according to claim 1, wherein the processing circuitry is configured to:
predict a power generation amount in the wireless communication device until the time point after the predetermined period has passed, and
predict the remaining capacity of the battery at the time point after the predetermined period has passed based on at least the predicted power generation amount in the wireless communication device and relational data indicating a relationship between the operating time and the transmittable time of the wireless communication device with respect to the power consumption amount in the wireless communication device, and a real-time measurement result of the remaining capacity of the battery of the wireless communication device.

6. The wireless communication management apparatus according to claim 5,
wherein the battery of the wireless communication device is charged through solar power generation, and
wherein the processing circuitry is configured to predict the power generation amount in the wireless communication device until the time point after the predetermined period has passed based on information regarding weather in a district where the wireless communication device is used.

7. The wireless communication management apparatus according to claim 5, wherein the processing circuitry is configured to:
calculate a difference between the measurement result and a prediction result predicted in the setting of the remaining capacity of the battery after setting the operating time and the transmittable time, and calculate a change over time of the difference after the setting,
predict the remaining capacity of the battery at the time point after the predetermined period has passed based on the change over time of the difference after a previous setting in addition to the predicted power generation amount, the relational data, and the real-time measurement result of the remaining capacity of the battery in each of the settings from the second time after start of the wireless communication device.

8. The wireless communication management apparatus according to claim 1, wherein the processing circuitry is configured to set the converted traffic amount as the traffic amount that the wireless communication device is able to transmit when the traffic amount obtained by converting the number of frames is less than a reference traffic amount, and set the reference traffic amount as the traffic amount that the wireless communication device is able to transmit when the converted traffic amount is equal to or greater than the reference traffic amount.

9. A wireless communication management method comprising:
predicting a remaining capacity of a battery at a time point after a predetermined period has passed in a wireless communication device on which the battery is mounted;
setting a condition that the predicted remaining capacity of the battery is greater than an allowable remaining capacity and each of an operating time and a transmittable time of the wireless communication device falls within a reference range, and setting the operating time and the transmittable time of the wireless communication device in a state in which the condition is satisfied;
calculating the number of frames that the wireless communication device is able to transmit based on a modulation and coding scheme (MCS), a maximum transmission unit (MTU) size, and an aggregation number between the wireless communication device and a transmission destination, and the set transmittable time; and
converting the calculated number of transmittable frames into a traffic amount and setting the traffic amount which the wireless communication device is able to transmit based on the converted traffic amount.

10. A non-transitory storage medium storing a wireless communication management program, the wireless communication management program causing a computer to:
predict a remaining capacity of a battery at a time point after a predetermined period has passed in a wireless communication device on which the battery is mounted;
set a condition that the predicted remaining capacity of the battery is greater than an allowable remaining capacity and each of an operating time and a transmittable time of the wireless communication device falls within a reference range, and set the operating time and the transmittable time of the wireless communication device in a state in which the condition is satisfied;
calculate the number of frames that the wireless communication device is able to transmit based on a modulation and coding scheme (MCS), a maximum transmission unit (MTU) size, and an aggregation number between the wireless communication device and a transmission destination, and the set transmittable time; and
convert the calculated number of transmittable frames into a traffic amount and set the traffic amount which the wireless communication device is able to transmit based on the converted traffic amount.

* * * * *